(12) United States Patent
Isono et al.

(10) Patent No.: US 6,289,271 B1
(45) Date of Patent: Sep. 11, 2001

(54) BRAKE BOOSTER DIAGNOSING APPARATUS CAPABLE OF OPTIMIZING DETERMINATION OF ABNORMALITY OF BOOSTER

(75) Inventors: Hiroshi Isono, Toyota; Yasuji Mizutani, Susono, both of (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/377,240

(22) Filed: Aug. 19, 1999

(30) Foreign Application Priority Data

| Aug. 24, 1998 | (JP) | 10-237417 |
| Jul. 8, 1999 | (JP) | 11-194927 |

(51) Int. Cl.[7] .............. B60T 13/52; B60T 17/22
(52) U.S. Cl. .......... 701/31; 701/29; 303/122.12
(58) Field of Search ........ 701/29, 31; 303/122, 303/122.09, 122.12

(56) References Cited

U.S. PATENT DOCUMENTS

| 5,261,730 | * | 11/1993 | Steiner et al. | 303/113.4 |
| 5,709,438 | * | 1/1998 | Isakson et al. | 303/113.4 |
| 5,954,406 | * | 9/1999 | Sawada | 303/122.09 |
| 5,967,628 | * | 10/1999 | Abe et al. | 303/122.12 |
| 5,991,681 | * | 11/1999 | Bill et al. | 701/70 |
| 6,019,438 | * | 2/2000 | Sawada et al. | 303/113.4 |
| 6,033,037 | * | 3/2000 | Eckert | 303/114.3 |
| 6,062,656 | * | 5/2000 | Unterforsthuber et al. | 303/122.09 |

FOREIGN PATENT DOCUMENTS 456669A  2/1992  (JP) .

OTHER PUBLICATIONS

U.S. application No. 09/248,854; Isono et al; filed Feb. 11, 1999.

* cited by examiner

Primary Examiner—Michael J. Zanelli
(74) Attorney, Agent, or Firm—Kenyon & Kenyon

(57) ABSTRACT

Apparatus for diagnosing a booster of a vehicle braking system including a brake pedal, a master cylinder for producing a hydraulic pressure on the basis of an output force of the booster produced by boosting of a brake pedal operating force by the booster, and a wheel brake cylinder activated by the hydraulic pressure to brake a vehicle wheel, wherein a determining device is adapted to make a provisional decision as to whether the booster is abnormal or not, on the basis of a relationship between an input quantity and an output quantity of the booster, and a optimizing device is adapted to determine the provisional decision as a final decision or rectifying the provisional decision.

39 Claims, 16 Drawing Sheets

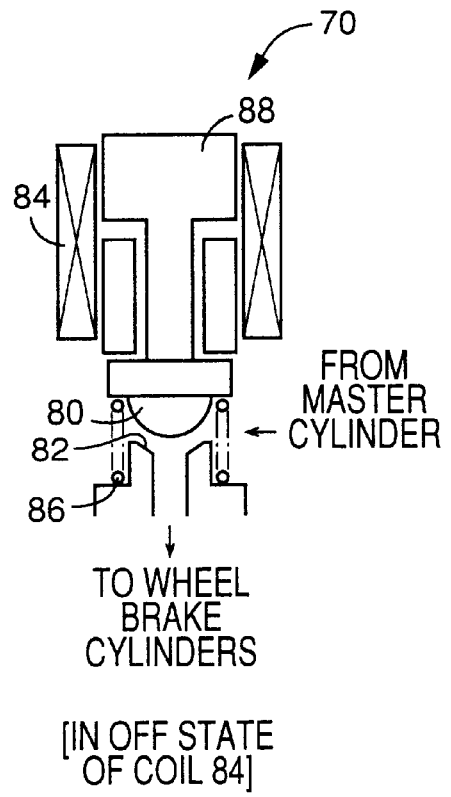
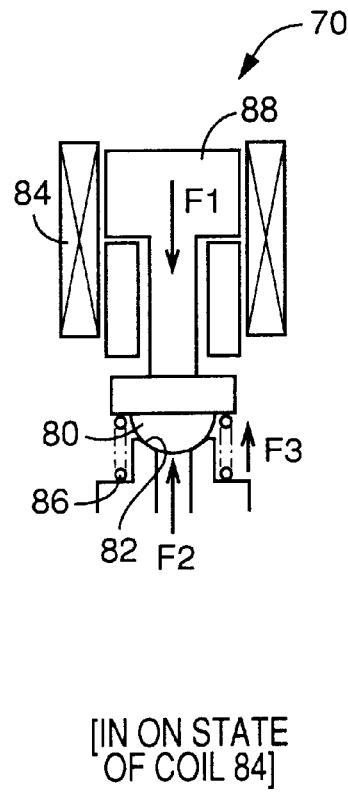
FIG. 4A  FIG. 4B
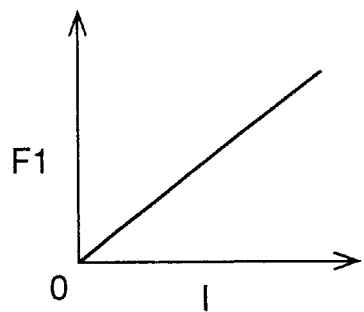
FIG. 5

RATE OF RISE dPMC/dt
OF MASTER CYLINDER PRESSURE

RATE OF RISE dPMC/dt

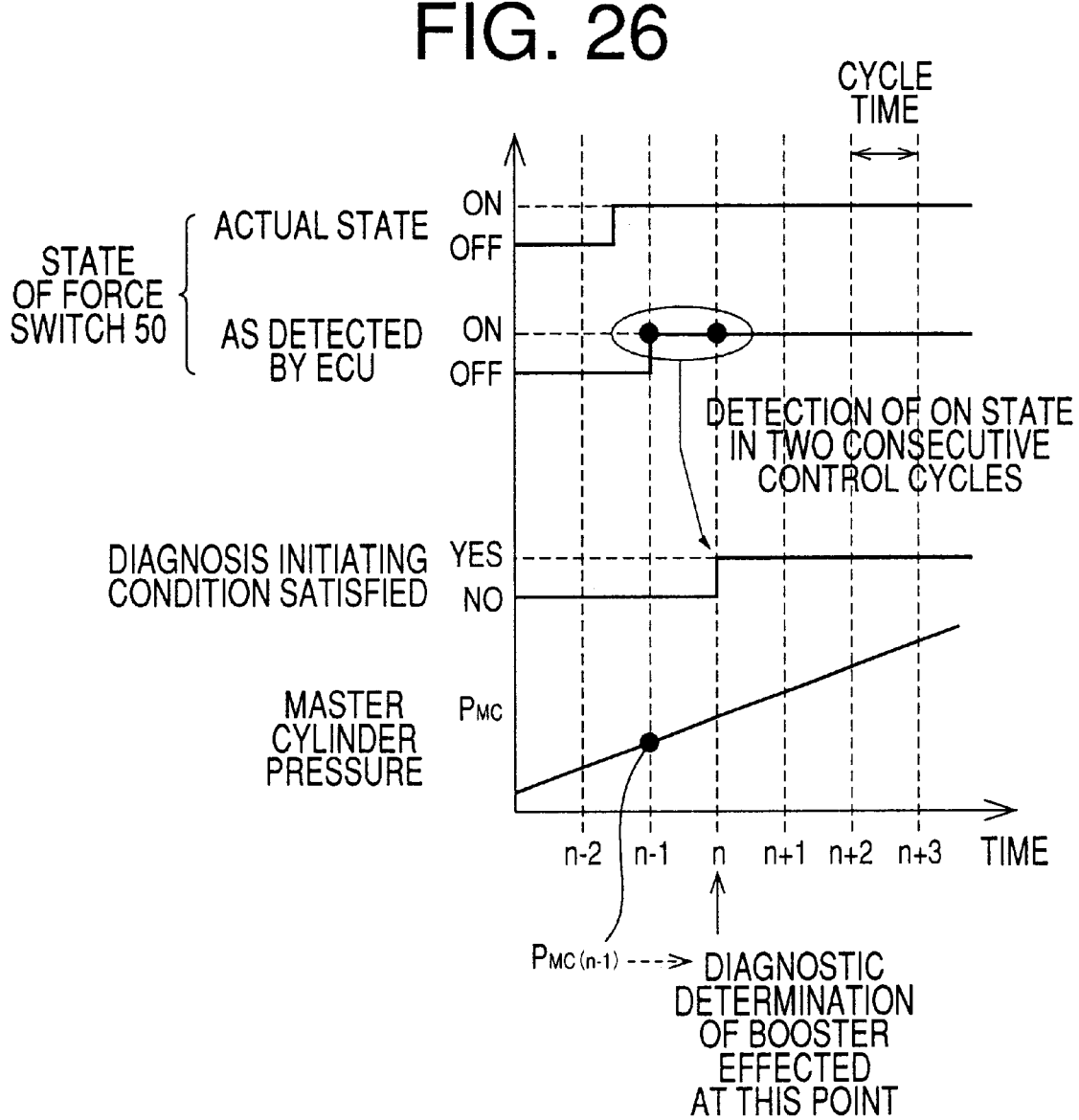

BRAKE BOOSTER DIAGNOSING APPARATUS CAPABLE OF OPTIMIZING DETERMINATION OF ABNORMALITY OF BOOSTER

This application is based on Japanese Patent Applications Nos. 10-237417 filed Aug. 24, 1998 and 11-194927 filed on Jul. 8, 1999, the content of which is incorporated hereinto by reference.

BACKGROUND OF THE INVENTION

1. Field of the Invention

The present invention relates to techniques for diagnosing a booster of a braking system for an automotive vehicle.

2. Discussion of the Related Art

JP-A-4-56669 discloses an example of a known technology for diagnosing a vacuum booster of a vehicle braking system, for any abnormality. This known diagnosing technique is based on a fact that the vacuum booster becomes inoperative to perform a normal boosting function when a negative pressure of a negative pressure source to which the vacuum booster is connected has been raised above a predetermined upper limit. According to the known diagnosing technology, a pressure switch is used to either mechanically or electrically detect that the negative pressure of the negative pressure source has exceeded the upper limit.

A study by the assignee of the present application has revealed that when the vacuum booster is abnormal, the input and the output of the booster do not have a predetermined or known nominal relationship, and that this fact can be utilized to effect a diagnosis of the booster for any abnormality.

In the light of the above findings, the assignee of the present application have developed an apparatus for diagnosing a vacuum booster, which is adapted to determine that the vacuum booster is abnormal, if the detected input and output do not meet a predetermined nominal relationship therebetween. This apparatus was not publicly known at the time the present invention was made.

As a result of a study of the developed diagnosing apparatus by the present inventors, the inventors obtained various findings regarding the diagnosis of the vacuum booster.

For instance, the present inventors found a possibility that the actually normal vacuum booster is erroneously diagnosed to be abnormal, due to a delayed operational response of the booster while the booster is in a transient state. It is desirable to reduce this possibility in the diagnosing apparatus.

Various design concepts are available in designing the diagnosing apparatus for the vacuum booster. According to one of the design concepts, the diagnosing apparatus is adapted to indicate that the booster is abnormal, irrespective of whether the booster is in a transient or steady state, if any abnormality of the booster is found. In this case, the diagnosing apparatus does not indicate that the booster is normal. This design concept suffers from a relatively high possibility that the booster is erroneously diagnosed to be abnormal when the booster is in fact normal. It is desirable to prevent such an erroneous diagnosis, and to cancel the erroneous diagnosis if it takes place.

According to another design concept, the diagnosing apparatus is adapted to indicate that the booster is normal, irrespective of whether the booster is in the transient or steady state, if no abnormality of the booster is found. This design concept suffers from a relatively high possibility that the booster is erroneously diagnosed to be normal when the booster is in fact abnormal, that is, a relatively high possibility that the booster is not correctly diagnosed to be abnormal when the booster is in fact abnormal. In this case, it is desirable to prevent a failure to correctly diagnose that the booster is abnormal when the booster is in fact abnormal.

According to a further design concept, the diagnosing apparatus is adapted such that when the operating condition of the booster has changed from the normal condition to an abnormal condition, the apparatus immediately indicate the abnormality of the booster. However, this design concept requires the apparatus to make frequent determinations as to whether the booster has become abnormal, and therefore suffers from a relatively high possibility of unnecessary determinations. It is desirable to eliminate the unnecessary determinations.

The diagnosing apparatus for diagnosing the vacuum booster is generally provided with an alarm indicator for warning the vehicle operator of the presence of an abnormality of the booster. On the other hand, it is considered unnecessary to warn the vehicle operator of the presence of an abnormality of the booster if the braking system is capable of producing a sufficiently large braking force. In this respect, it is desirable that the diagnosis of the booster by the diagnosing apparatus is effected depending upon the necessity for the vehicle operator to pay attention to the operating condition of the braking system.

SUMMARY OF THE INVENTION

It is therefore an object of the present invention to provide an apparatus which permits optimum diagnosis of a brake booster for any abnormality.

The above object may be achieved according to any one of the following modes (1)–(36) of this invention. Each of these modes of the invention is numbered like the appended claims, and depends from the other mode or modes, where appropriate, so as to indicate possible combinations of technical features of some of the following modes, which fall within the principle of the present invention. However, it is to be understood that the invention is not limited to those features or those combinations of features.

(1) An apparatus for diagnosing a booster of a braking system for an automotive vehicle, the braking system including a brake operating member operated with a brake operating force, a master cylinder for producing a hydraulic pressure on the basis of an output force of the booster produced as a result of boosting of the brake operating force by the booster, and a wheel brake cylinder which is activated by the hydraulic pressure produced by the master cylinder, to brake a wheel of the automotive vehicle, the apparatus comprising: a determining device for making a decision as to whether the booster is abnormal or not, on the basis of a relationship between an input quantity relating to an input of the booster and an output quantity relating to an output of the booster; and an optimizing device for optimizing an operation of the determining device to make the decision.

In the diagnosing apparatus of the present invention constructed according to the above mode (1), the determining device makes a provisional decision as to whether the booster is abnormal or not, on the basis of the relationship between the input quantity and output quantity of the booster, and the optimizing device optimizes the operation of the determining device. The optimizing device is adapted to effect at least one of (a) preventing execution of the decision erroneously made by the determining device that the booster is abnormal when the booster is in fact normal, (b) preventing execution of the decision erroneously made by the determining device that the booster is normal when the booster is in fact abnormal, (c) cancelling the decision erroneously made by the determining device, before a next operation of the brake operating member, and (d) preventing execution of the decision made by the determining device, when the execution of the decision is unnecessary.

The present diagnosing apparatus including the optimizing device is therefore capable of diagnosing the booster for any abnormality, with improved accuracy.

The booster to be diagnosed by the present diagnosing apparatus may be a vacuum booster operated by a negative pressure received from an appropriate vacuum source, or a hydraulic booster operated by a hydraulic pressure received from an appropriate hydraulic pressure source.

The input quantity of the booster may be an input force per se received by the booster, or any physical quantity other than the input force per se, which quantity may be used as an equivalent of the input force. Similarly, the output quantity may be an output force per se produced by the booster, or any physical quantity other than the output force per se, which quantity may be used as an equivalent of the output force. For instance, the input quantity may be an operating force acting on the brake operating member, an operating stroke of the brake operating member, a force applied to an input member of the booster, and an operating stroke of the input member, and the output quantity may be a hydraulic pressure in the master cylinder, a force acting on an output member of the booster, a hydraulic pressure in the wheel brake cylinder, a braking force applied to the wheel, and a deceleration value of the vehicle.

In the present diagnosing apparatus, the relationship between the input and output quantities used by the determining device to determine whether the booster is abnormal or not may be obtained on the basis of an input quantity and an output quantity which change with time in relation to each other.

(2) An apparatus according to the above mode (1), wherein the optimizing device includes change-rate obtaining means for obtaining a rate of change of at least one of the input quantity and the output quantity, and means for determining whether the booster is abnormal or not, on the basis of the rate of change obtained by the change-rate obtaining means, as well as the input and output quantities.

The booster has a characteristic that the output quantity is smaller when the booster is in a transient operating state than when it is in a steady operating state. On the other hand, the rate of change of the input quantity of the booster may be used to estimate whether the booster is in the transient or steady operating state, and to estimate the degree of the transience. It is also noted that the output quantity changes with a change in the input quantity. Based on these findings, the optimizing device of the apparatus according to the above mode (2) is adapted to determine whether the booster is abnormal or not, based on not only the input and output quantities but also the rate of change at least one of the input and output quantities. This optimizing device makes it possible to prevent an erroneous decision that the booster in the normal state is abnormal, which erroneous decision would take place due to the transient operating state of the booster.

The rate of change of the input quantity may be a rate of change of the operating speed of the brake operating member, for example. The rate of change of the output quantity may be a rate of change of the hydraulic pressure in the master cylinder.

(3) An apparatus according to the above mode (2), wherein the change-rate obtaining means obtains the rate of change of the at least one of the input and output quantities when the brake operating force is equal to a predetermined value which is not zero, and the determining device comprises means for determining whether the booster is abnormal or not, by comparing the output quantity with a threshold value, and threshold changing means for changing the threshold value such that the threshold value is smaller when the rate of change obtained when the brake operating force is equal to the predetermined value is relatively high than when the rate of change is relatively low.

In the above mode (2) wherein the threshold value changes with the rate of change of the output quantity, for example, the accuracy of determination as to whether the booster is abnormal or not can be made higher than in the case wherein the threshold value is a fixed constant value.

(4) An apparatus according to the above mode (3), wherein the change-rate obtaining means for obtaining the rate of change when the brake operating force is equal to the predetermined value obtains a highest value of the rate of change when or after the brake operating force has been increased to the predetermined value.

The highest value of the rate of change is not always obtained when the brake operating force has been increased to the predetermined value, but may be obtained after the predetermined value of the brake operating force has been reached. Considering that the rate of change is also used for changing the threshold value, it is desirable to use the highest value of the rate of change, since the highest value more accurately reflects the characteristic of the rate of change. Based on these findings, the highest value is obtained by the change-rate obtaining means in the apparatus according to the above mode (4).

(5) An apparatus according to any one of the above modes (1)–(4), wherein the determining device provisionally determines whether the booster is abnormal or not, according to a first rule, and the optimizing device comprises additional determining means operable when the determining device has made a provisional decision that the booster is abnormal, for making a final decision as to whether the booster is abnormal or not, according to a second rule different from the first rule.

In the apparatus according to the above mode (5), the provisional decision initially made by the determining device that the booster is abnormal is not made final as long as the additional determining means of the optimizing device makes the final decision that the booster is abnormal. This arrangement is effective prevents an erroneous decision that the booster which is in fact normal is abnormal.

In the apparatus according to the above mode (5), the time interval between the point of time at which the determining device makes the provisional decision and the point of time at which the additional determining means makes the final decision is preferably determined so that the additional determining means is activated only after the booster has been brought into a substantially steady operating state in which the output quantity does not substantially change with the time. In this arrangement, the determining device is considered to function as dynamic determining means for determining whether the booster is abnormal or not, while the booster is placed in the transient operating state, and the additional determining means is considered to function as static determining means for determining whether the booster is abnormal or not, while the booster is placed in the substantially steady operating state.

The second rule used by the additional determining means may or may not include or depend upon a relationship between the input and output quantities of the booster.

(6) An apparatus according to the above mode (5), wherein the determining device makes the provisional decision that the booster is abnormal, during an operation of the brake operating member, and the additional determining means determines whether the brake operating member has been operated for more than a predetermined period of time after a reference point of time relating to a point of time at which the provisional decision has been made, the additional determining means making the final decision that the booster is not abnormal, if the brake operating member has not been operated for more than the predetermined period of time.

Usually, the brake operating member is continuously operated for a certain period of time. However, the brake operating member may be alternately operated and released repeatedly in a so-called "pumping" manner. The repeated operations of the brake operating member in the pumping manner are distinguished from an abrupt or rapid action of continuously changing the operating amount of the brake operating member. In both cases, the determining device would make an erroneous decision that the booster is abnormal when it is in fact normal, if the additional determining means were not provided. For instance, where the booster is a vacuum booster, the negative pressure (absolute value) in the negative-pressure chamber may be excessively reduced after the pumping actions of the brake operating member or the series of abrupt actions of changing the operating amount, even when the vacuum source for operating the booster is normally functioning. According to the above mode (5), the additional determining means makes it possible to prevent the erroneous decision that the booster is abnormal, only where the brake operating member is operated in the pumping manner.

Based on the above findings, the additional determining means of the optimizing device is adapted to make the final decision that the booster is abnormal, only where the brake operating member has been operated for more than the predetermined period of time, when the determining device makes the provisional decision that the booster is abnormal. To this end the predetermined period of time is determined to be longer than a time period; for which each operation of the brake operating member during the pumping actions is expected to continue. This arrangement enables the additional determining means to rectify the erroneous provisional decision by the determining device that the booster is abnormal, due to the pumping actions of the brake operating member.

The determination as to whether the brake operating member has been operated for more than the predetermined period of time may be made by determining whether the brake operating member has been held in an operated position for more than the predetermined period of time, or whether the brake operating force acting on the brake operating member has been held larger than a predetermined value larger than zero, for more than the predetermined period of time.

The reference point of time relating to the point of time at which the provisional decision has been made may be a point of time at which the operation of the brake operating member from the non-operated position to an operated position is initiated, or a point of time at which the provisional decision is made by the determining device, for instance, a point of time at which the input quantity of the booster has become equal to a predetermined value which is not zero.

(7) An apparatus according to the above mode (6), wherein the predetermined period of time is shorter when the automotive vehicle is running than when the automotive vehicle is at rest.

In the apparatus according to the above mode (6), the predetermined period of time may be a fixed constant, or a variable. It is noted, however, that the booster is required to be diagnosed relatively frequently while the vehicle is running, but is not required to be diagnosed frequently while the vehicle is at rest.

In the apparatus according to the above mode (7), the predetermined period of time is determined to be shorter when the vehicle is running when when the vehicle is at rest. This arrangement is effective to prevent frequent diagnosis of the booster while the vehicle is at rest.

(8) An apparatus according to the above mode (6), wherein the predetermined period of time changes with a change in a running speed of the automotive vehicle.

In the apparatus according to the above mode (8), the predetermined period of time may be determined to be shorter when the vehicle running speed is relatively high than when it is relatively low, for example.

(9) An apparatus according to any one of the above modes (6)–(8), wherein the predetermined period of time changes with a change in a rate of change of at least one of the input quantity and the output quantity of the booster.

In the apparatus according to the above mode (9), the predetermined period of time may be determined to be shorter when the rate of change of at least one of the input and output quantities of the booster is relatively high than when it is relatively low.

(10) An apparatus according to any one of the above modes (6)–(9), wherein the determining device comprises a first determining portion for making the provisional decision as to whether the booster is abnormal or not, by comparing the output quantity with a first threshold value, and the additional determining means comprises a second determining portion for making the final decision as to whether the booster is abnormal or not, by comparing the output quantity with a second threshold value larger than the first threshold value.

(11) An apparatus according to the above mode (10), wherein the first determining portion determines whether the output quantity when the input quantity is equal to a preset value which is not zero is smaller than the first threshold value, and makes the provisional decision that the booster is abnormal, if the output quantity is smaller than the first threshold value, and the second determining portion determines whether the output quantity a predetermined time after the provisional decision has been made is smaller than the second threshold value, and makes the final decision that the booster is abnormal, if the output quantity is smaller than the second threshold value, and wherein the apparatus is designed to diagnose the booster to be abnormal if the output quantity when the input quantity is equal to a reference value larger than the preset value is smaller than a nominal value corresponding to the reference value, and the booster is designed such that the output quantity when the input quantity is equal to the preset value is larger than the nominal value, the second threshold value being determined to be equal to the nominal value or larger.

In the apparatus according to the above mode (11), the second determining portion is adapted to make the final decision that the booster is abnormal, if the output quantity of the booster when the input quantity is equal to the preset value or larger is smaller than the second threshold value which is equal to or larger than the nominal value, irrespective of whether the input quantity is equal to the reference value or not. In this apparatus, a relatively severe condition should be satisfied for the second determining portion to make the final decision that the booster is normal, so that the erroneous decision that the booster which is in fact abnormal is normal can be effectively prevented.

(12) An apparatus according to the above mode (10) or (11), wherein the second determining portion of the additional determining means comprises means operable when the second determining portion determines that the booster is abnormal, for determining whether at least one of the output quantity and a rate of change of the output quantity is larger than a reference value, and determining that the booster is not abnormal, irrespective of the relationship between the input and output quantities.

If the output quantity and/or the rate of change of this output quantity is/are larger than a third threshold value or value during an operation of the brake operating member, it means a possibility that a sufficiently large braking force is applied to the vehicle wheel. On the other hand, the diagnosing apparatus for diagnosing the booster is preferably provided with an alarm indicator adapted to inform the vehicle operator with the final decision that the booster is abnormal. It is also noted that it may not be necessary to inform the vehicle operator of the presence of an abnormality of the booster, if the vehicle wheel is braked with a sufficiently large braking force.

Based on the above findings, the second determining portion of the additional determining means is adapted to comprise means operable when the second determining portion determines that the booster is abnormal, for determining whether at least one of the output quantity and a rate of change of the output quantity is larger than a third threshold value, and determining that the booster is not abnormal, irrespective of the relationship between the input and output quantities. Accordingly, the present diagnosing apparatus optimizes the determination that the booster is abnormal, in relation to the necessity to draw the attention of the vehicle operator to the presence of any abnormality of the booster.

(13) An apparatus according to any one of the above modes (5)–(9), wherein the additional determining means comprises means operable when the determining diagnosing device has made the provisional decision that the booster is abnormal, for determining whether at least one of the output quantity and a rate of change of the output quantity is larger than a reference value, and determining that the booster is not abnormal, irrespective of the relationship between the input and output quantities.

In the apparatus according to the above mode (13) which was also developed based on the findings described above with respect to the above mode (12), the additional determining means comprises means operable when the determining device has made the provisional decision that the booster is abnormal, for determining whether at least one of the output quantity and a rate of change of the output quantity is larger than a reference value, and determining that the booster is not abnormal, irrespective of the relationship between the input and output quantities. Like the apparatus according to the above mode (12), the apparatus according to the above mode (13) permits optimization of the determination that the booster is abnormal, in relation to the necessity to draw the attention of the vehicle operator to the presence of any abnormality of the booster.

The output quantity in the above mode (13) may be the hydraulic pressure in the master cylinder, or a deceleration value of the automotive vehicle.

(14) An apparatus according to any one of the above modes (5)–(13), wherein the determining device and the additional determining means of the optimizing device are operated repeatedly, as long as the determining device makes the provisional decision that the booster is abnormal while the additional determining means makes the final decision that the booster is not abnormal, and wherein the optimizing device further comprises simplified determining means operable when the additional determining means has made the final decision that the booster is abnormal, for inhibiting the determining device from being operated, and determining, in the same manner as the determining device, whether the booster is abnormal or not, the simplified determining means inhibiting the additional determining means from being operated when the simplified determining means has made a final decision that the booster is not abnormal.

Where the determining device is adapted to always determine that the booster is normal when the booster is in fact normal, the decision by the determining diagnosing device that the booster is normal can be respected. Based on this finding, the optimizing device of the apparatus according to the above mode (14) comprises simplified determining means which is operated when the additional determining means has made the final decision that the booster is abnormal, for inhibiting the determining diagnosing device from being operated, and effecting the determination as to whether the booster is abnormal or not, in the same manner as the determining device. If the simplified determining means has made a final decision that the booster is not abnormal, namely, that the booster is normal, the simplified determining means inhibits an operation of the additional determining means.

The apparatus according to the above mode (14) permits a prompt change in the final decision following the actual change of the operating condition of the booster from an abnormal condition to the normal condition.

(15) An apparatus according to any one of the above modes (5)–(13), wherein the determining device and the additional determining means of the optimizing device are operated repeatedly, as long as the determining device makes the provisional decision that the booster is abnormal while the additional determining means makes the final decision that the booster is not abnormal, and wherein the optimizing device further comprises simplified determining means operable when the additional determining means has made the final decision that the booster is abnormal, for inhibiting the determining device from being operated, and determining, in the same manner as the determining device, whether the booster is abnormal or not, the simplified determining means inhibiting the additional determining means from being operated when the simplified determining means has made a final decision that the booster is abnormal.

In the apparatus according to the above mode (15), the simplified determining means is operated when the additional determining means has made the final decision that the booster is abnormal, for inhibiting the determining device from being operated, and determining, in the same manner as the determining device, whether the booster is abnormal or not. When the simplified determining means has made a final decision that the booster is abnormal, this simplified determining means inhibits an operation of the additional determining means. If the determining device has made the provisional decision that the booster is abnormal after the additional determining means has made the final decision that the booster is not abnormal, the simplified determining means permits the additional determining means to be operated again to determine whether the booster is abnormal or not.

In the apparatus indicated above, if the simplified determining means determines that the booster is abnormal after the additional determining means has made the final decision that the booster is abnormal, the additional determining means is not operated again. In this case the determination by the simplified determining means is made final. If the simplified determining means determines that the booster is abnormal after the additional determining means has made the final decision that the booster is not abnormal, the additional determining means is again operated.

Thus, the apparatus according to the above mode (15) is adapted such that once the additional determining means has made the final decision that the booster is abnormal, the additional determining means is not operated again if the simplified determining means determines that the booster is abnormal. If the additional determining means has made the final decision that the booster is not abnormal, the additional determining means is operated again if the first-diagnosing device subsequently determines that the booster is abnormal.

Thus, the apparatus indicated above is based on an assumption that the reliability of the decision by the determining device that the booster is abnormal is higher in the case where the additional determining means has made the final decision that the booster is abnormal, than in the case where the additional determining means has made the final decision that the booster is normal. In the former case, an unnecessary operation of the additional determining means is eliminated, whereby the final decision that the booster is abnormal can be made at a relatively early point of time.

(16) An apparatus according to any one of the above modes (1)–(15), further comprising a sensor for detecting the output quantity, and wherein the determining device comprises calculating means for obtaining a detected value of the output quantity on the basis of an output signal of the sensor, and compensating means for obtaining a compensated value of the output quantity by compensating the detected value depending upon a delay time required for the detected value to become equal to an actual value of the output quantity, the determining device making the provisional decision on the basis of the compensated value of the output quantity.

In the apparatus according to the above mode (16), it is possible to prevent an erroneous decision regarding the presence of an abnormality of the booster due to the delay time between the detected and actual values of the output quantity of the booster.

The sensor may be a sensor for detecting the hydraulic pressure in the master cylinder, or a hydraulic pressure which represents the pressure in the master cylinder.

(17) An apparatus according to the above mode (16), wherein the compensating means detects a rate of change of the output quantity, and estimates the delay time on the basis of the detected rate of change and according to a predetermined relationship between the rate of change and the delay time, the compensating means compensating the detected value of the output quantity by obtaining a product of the estimated delay time and the rate of change.

(18) An apparatus according to any one of the above modes (1)–(17), wherein the determining device determines whether the booster is abnormal or not, while the brake operating member is being operated from a non-operated position to an operated position, and the optimizing device comprises decision cancelling means operable after the determining device has made a provisional decision that the booster is abnormal and during a time period between a point of time when an operation of the brake operating member from the operated position back to the non-operated position is initiated and a point of time when a next operation of the brake operating member from the non-operated position to the operated position is initiated, the decision cancelling means determining whether the booster is normal or not, and cancelling the provisional decision by the determining device that the booster is abnormal, if the decision cancelling means determines that the booster is normal.

If the determining diagnosing device was not arranged to make the decision as to whether the booster is abnormal or not, until the next operation of the brake operating member is initiated, where the determining device has made an erroneous provisional decision, the erroneous decision would be repeatedly made from the termination of the present operation of the brake operating member to the initiation of the next operation. In the apparatus according to the above mode (18), the decision cancelling means is operated after the determining device has made the provisional decision that the booster is abnormal, to make a determination as to whether the booster is normal or not, until the next operation of the brake operating member is initiated. If the decision cancelling means determines that the booster is now normal, it cancels the provisional decision by the determining device that the booster is abnormal.

Thus, the apparatus indicated above promptly rectifies the decision by the determining device until the next operation of the brake operating member is initiated, whereby the erroneous decision by the determining device will not continue for a long time.

(19) An apparatus according to the above mode (18), wherein the decision cancelling means determines whether the booster is normal or not, by comparing the output quantity at a predetermined point of time during the time period with a predetermined threshold.

In the apparatus according to the above mode (19), the predetermined point of time may be a point of time at which the output quantity of the booster has been reduced to a preset value, or a point of time at which the brake operating member has been returned from the operated position to the non-operated position.

(20) An apparatus according to the above mode (19), wherein the reference is larger than a minimum value of the output quantity at the predetermined point of time, and the decision cancelling means determines that the booster is normal, if the output quantity at the predetermined point of time is not smaller than the reference value.

(21) An apparatus according to any one of the above modes (1)–(20), further comprising inhibiting means for inhibiting operations of the determining device and the optimizing device when a drive power source of the automotive vehicle is substantially at rest.

Even if the booster is actually abnormal after the power switch of the vehicle is turned on by the vehicle operator, it is not necessary to inform the vehicle operator that the booster is abnormal, while the drive power source of the vehicle is substantially at rest. In other words, it is suffice to inform the operator of the presence of an abnormality of the booster after the drive power source has been substantially brought to an operating state. Based on this find, the apparatus according to the above mode (21) comprises inhibiting means for inhibiting operations of the determining and optimizing devices when the drive power source is substantially at rest. Thus, the determining and optimizing devices will not make a decision that the booster is abnormal even when the booster is in fact abnormal, as long as the drive power source is substantially at rest.

(22) An apparatus according to any one of the above modes (1)–(20), further comprising inhibiting means for inhibiting operations of the determining and optimizing devices when the automotive vehicle is substantially at rest.

(23) An apparatus according to any one of the above modes (1)–(20), further comprising inhibiting means for inhibiting operations of the determining and optimizing devices when the automotive vehicle and a drive power source of the automotive vehicle are substantially at rest.

(24) An apparatus according to the above mode (1), wherein the determining device includes means for obtaining the input quantity at a predetermined time interval and making the decision as to whether the booster is abnormal or not, if the obtained input quantity satisfies a predetermined condition, and the optimizing device commands the determining device to make the decision as to whether the booster is abnormal or not, only if the obtained input quantity has satisfied a predetermined plurality of times.

The diagnosing apparatus according to any one of the above modes (1)–(23) may be arranged such that the determining device makes the decision as to whether the booster is abnormal or not, immediately after the determining device determines that the input quantity satisfies a predetermined condition. However, this arrangement may suffer from an erroneous diagnosis of the booster, if the obtained input quantity has an error, which causes the determining device to make the decision as to whether the booster is abnormal or not, even when the predetermined condition is not in fact satisfied by the obtained input quantity.

In the diagnosing apparatus according to the mode (24) described above, however, the optimizing device commands the determining device to make the decision as to whether the booster is abnormal or not, only after the input quantity obtained by the determining device at the predetermined time interval has satisfied the predetermined number of times. This arrangement is effective to reduce the error of the obtained input quantity and accordingly reduce the possibility of erroneous diagnosis due to the error of the obtained input quantity.

(25) An apparatus according to the above mode (24), wherein the determining device includes a switch which is placed in a first state when the input quantity is smaller than a predetermined value larger than zero, and in a second state when the input quantity is not smaller than the predetermined value, the predetermined condition being satisfied when the switch is placed in the second state.

(26) An apparatus according to the above mode (24), wherein the determining device includes a sensor whose output changes in three steps or continuously, depending upon the input quantity, the predetermined condition being satisfied when the input quantity represented by the output of the sensor is larger than a predetermined value larger than zero.

(27) An apparatus according to the above mode (1), wherein the determining device includes means for obtaining the input quantity at a predetermined time interval and determining that a diagnosis initiating condition is satisfied when the obtained input quantity is larger than a predetermined value larger than zero, the determining device further including means operable when the diagnosis initiating condition is satisfied, for effecting a diagnostic determination that the booster is abnormal, if the output quantity which changes in relation to the input quantity is smaller than a predetermined threshold which is substantially equal to a minimum value of the output quantity when the input quantity is equal to the predetermined value thereof while the booster is normal, and wherein the optimizing device includes means for commanding the determining device to use, for the diagnostic determination, a value of the output quantity which is obtained a predetermined time before the determining device has determined that the diagnosis initiating condition is satisfied.

The diagnosing apparatus according to any one of the above modes (1)–(26) may be arranged such that the determining device determines whether a predetermined diagnosis initiating condition is satisfied or not, by determining whether the obtained input quantity has become larger than a predetermined value, and if the diagnosis initiating condition is satisfied, determines whether the input quantity obtained when the condition is satisfied is smaller than a predetermined threshold, and determines that the booster is abnormal if the input quantity is smaller than the threshold.

The above arrangement may be adapted such that the determining device determines that the diagnosis initiating condition is satisfied immediately after the obtained input quantity has become larger than the predetermined value, or such that the determining device determines that the diagnosis initiating condition is satisfied, only if the obtained input quantity has become larger than the predetermined value a predetermined plurality of times.

In either of the two cases, the input quantity obtained when the diagnosis initiating condition is satisfied is used for the diagnostic determination whether the booster is abnormal or not.

Since the input quantity is obtained from time to time at the predetermined time interval while the input quantity increases with an increase in the operating amount of the brake operating member, a point of time at which the obtained input quantity has become larger than the predetermined value is not necessarily coincident with a point of time at which the actual value of the input quantity has become larger than the predetermined value. This time difference increases with an increase in the speed at which the brake operating member is operated.

In the diagnosing apparatus according to the above mode (27), the optimizing device is adapted to command the determining device to use, for the diagnostic determination, a value of the output quantity which is obtained a predetermined time before the determining device has determined that the diagnosis initiating condition is satisfied. The above-indicated value of the output quantity obtained the predetermined time before the diagnosis initiating condition is satisfied is closer a value thereof at the point of time at which the actual value of the input quantity has become larger than the predetermined value. Accordingly, the accuracy of the diagnostic determination based on the above-indicated value of the output quantity is improved.

(28) An apparatus according to the above mode (27), wherein the determining device includes means for obtaining the output quantity from time to time with a predetermined cycle time which is substantially the same as the predetermined time interval at which the input quantity is obtained, the determining device determining that the diagnosis initiating condition is satisfied, immediately after the determining device determines that the obtained input quantity has become larger than the predetermined value, and the optimizing device commands the determining device to effect the diagnostic determination as to whether the booster is abnormal or not, on the basis of at least a second value of the output quantity which is obtained the predetermined cycle time before a first value of the output quantity obtained when the obtained input quantity has become larger than the predetermined value.

Where the determining device obtains the input quantity at the predetermined time interval, the point of time at which the actual value of the input quantity has become equal to the predetermined value is between the points of time at which the current and last values of the input quantity are obtained. The last value of the input quantity is obtained the predetermined cycle time before the present time, that is, before the point of time at which the above-indicated first value is obtained. Based on this finding, the diagnosing apparatus according to the above mode (28) is arranged such that the optimizing device commands the determining device to effect the diagnostic determination on the basis of at least the above-indicated second value of the output quantity which is obtained the predetermined cycle time before the obtained input quantity has become larger than the predetermined value, and optionally also on the basis of the above-indicated first value value of the output quantity obtained when the obtained input quantity has become larger than the predetermined value. The determining device may be adapted to compare either the second value of the output quantity or an average of the first and second values of the output quantity, with the predetermined threshold.

(29) An apparatus according to the above mode (27), wherein the optimizing device includes means for commanding the determining device to determine that the diagnosis initiating condition is satisfied, if the obtained input quantity has become larger than the predetermined value a predetermined plurality of times, and to use, for the diagnostic determination, a value of the output quantity which is obtained when the obtained input quantity has become larger than the predetermined value for the first time.

In the diagnosing apparatus according to the above mode (29), the determining device determines that the predetermined diagnosis initiating condition is satisfied, when the obtained input quantity has become larger than the predetermined value the predetermined number of times, and the value of the output quantity when the obtained input quantity has become larger than the predetermined value for the first time is used to effect the diagnostic determination as to whether the booster is abnormal or not. In this apparatus, the diagnostic determination is effected on the basis of the value of the output quantity which is closer to a value thereof at the time when the actual value of the input quantity has become equal to the predetermined value, although the input quantity changes (increases) between a point of time at which the obtained input quantity has become larger than the predetermined value for the first time, and a point of time at which the diagnosis initiating condition is satisfied, that is, a point of time at which the obtained input quantity has become larger than the predetermined value the predetermined number of times.

(30) An apparatus according to the above mode (27), wherein the determining device includes means for obtaining the output quantity from time to time with a predetermined cycle time which is substantially the same as the predetermined time interval at which the input quantity is obtained, and the optimizing device commands the determining device to determine that the diagnosis initiating condition is satisfied, if the obtained input quantity has become larger than the predetermined value a predetermined plurality of times, and when the diagnosis initiating condition is satisfied, effect the diagnostic determination as to whether the booster is abnormal or not, on the basis of at least one of a first value of the output quantity which is obtained when said obtained input quantity has become larger than said predetermined value for the first time, and a second value of the output quantity which is obtained the predetermined cycle time before the obtained input quantity has become larger than the predetermined value for the first time.

Where the determining device obtains the input quantity at the predetermined time interval, the point of time at which the actual value of the input quantity has become equal to the predetermined value is between the points of time at which the current and last values of the input quantity are obtained. The last value of the input quantity is obtained the predetermined cycle time before the present time, that is, before the point of time at which the above-indicated first value is obtained. Based on this finding, the diagnosing apparatus according to the above mode (30) is arranged such that the optimizing device commands the determining device to effect the diagnostic determination on the basis of at least the second value of the output quantity which is obtained the predetermined cycle time before the obtained input quantity has become larger than the predetermined value, and optionally also on the basis of the first value of the output quantity obtained when the obtained input quantity has become larger than the predetermined value. The determining device may be adapted to compare either the second value of the output quantity or an average of the first and second values of the output quantity, with the predetermined threshold.

(31) An apparatus according to the above mode (29) or (30), wherein the determining device includes a switch which is placed in a first state when the input quantity is smaller than a predetermined value larger than zero, and in a second state when the input quantity is not smaller than the predetermined value, and the optimizing device commands the determining device to determine that the diagnosis initiating condition is satisfied, if the switch is found to be placed in the second state a predetermined plurality of times.

(32) An apparatus according to the above mode (29) or (30), wherein the determining device includes a sensor whose output changes in three steps or continuously, depending upon the input quantity, and the optimizing device command the determining device to determine that the diagnosis initiating condition is satisfied, if the input quantity represented by the output of said sensor is found to be larger than said predetermined value said predetermined plurality of times.

(33) An apparatus according to any one of the above modes (30)–(32), wherein the optimizing device commands the determining device to use, for the diagnostic determination, the above-indicated first value of the output quantity which is obtained when the obtained input quantity has become larger than the predetermined value for the first time.

In the diagnosing apparatus according to any one of the above modes (30)–(32), the above-indicated first value of the output quantity tends to be larger than the above-indicated second value, since the output quantity may increase with an increase in the operating amount of the brake operating member during determination as to whether the diagnosis initiating condition is satisfied. It is also noted that as the output quantity used for the diagnostic determination increases, the possibility that the output quantity is smaller than the predetermined threshold is reduced, that is, the possibility that the booster is diagnosed to be abnormal is reduced.

In the diagnosing apparatus according to the above mode (33) wherein the above-indicated first value of the output quantity is used, a possibility of an erroneous determination that the booster is abnormal while in fact the booster is normal can be effectively reduced or eliminated.

(34) An apparatus according to any one of the above modes (28) and (30)–(32), wherein the optimizing means commands the determining device to use, for the diagnostic determination, the second value of the output quantity.

Unlike the diagnosing apparatus according to the above mode (33), the diagnosing apparatus according to the above mode (34) is adapted such that the second value of the output quantity smaller than the first value is used for the diagnostic determination by the determining device. Accordingly, a possibility of an erroneous determination that the booster is normal while in fact the booster is abnormal can be effective reduced or eliminated.

(35) An apparatus according to any one of the above modes (28) and (30)–(32), wherein the optimizing means command the determining device to use, for the diagnostic determination, a value calculated on the basis of both of the first and second values of the output values.

The value calculated on the basis of the first and second values of the output values may be an average of these two values.

(36) An apparatus for diagnosing a booster of a braking system for an automotive vehicle, the braking system including a brake operating member operated with a brake operating force, a master cylinder for producing a hydraulic pressure on the basis of an output force of the booster produced as a result of boosting of the brake operating force by the booster, and a wheel brake cylinder which is activated by the hydraulic pressure produced by the master cylinder, to brake a wheel of the automotive vehicle, the apparatus comprising: a diagnosing device for making a decision as to whether the booster is abnormal or not; determining means for determining whether a period of time during which the brake operating member has been kept in an operated state is shorter than a preset time; and inhibiting means for inhibiting an operation of the diagnosing device if the determining means determines that the period of time is shorter than the preset time.

The diagnosing apparatus according to the above mode (36) is capable of preventing an erroneous decision that the booster which is in fact normal is abnormal, which erroneous decision would arise due to so-called pumping operations of the brake operating member wherein the brake operating member are alternately and repeated operated between the non-operated position and an operated position.

The "operated state" of the brake operating member may be detected when the brake operating member has been operated to an operated position, or when an operating force acting on the brake operating member is larger than a predetermined value which is not zero.

(37) An apparatus for diagnosing a booster of a braking system for an automotive vehicle, the braking system including a brake operating member operated with a brake operating force, a master cylinder for producing a hydraulic pressure on the basis of an output force of the booster produced as a result of boosting of the brake operating force by the booster, and a wheel brake cylinder which is activated by the hydraulic pressure produced by the master cylinder, to brake a wheel of the automotive vehicle, the apparatus comprising: first determining means for determining whether the booster is abnormal or not, while the brake operating member is being operated from a non-operated position to an operated position; and second determining means for determining whether the booster is abnormal or not, during a time period between a point of time when an operation of the brake operating member from the non-operated position back to the non-operated position is initiated and a point of time when a next operation of the brake operating member from the non-operated position to the operated position is initiated.

The diagnosing apparatus according to the above mode (37) is arranged such that a decision as to whether the booster is abnormal or not is made not only while the output quantity of the booster is being increased, but also while the output quantity is being reduced, so that the accuracy of the decision is readily improved.

BRIEF DESCRIPTION OF THE DRAWINGS

The above and optional objects, features, advantages and technical and industrial significance of the present invention will be better understood by reading the following detailed description of presently preferred embodiments of the invention, when considered in connection with the accompanying drawings, in which:

FIGS. 4A and 4B are plan views in cross section for explaining a construction and an operation of a pressure control valve provided in the braking system of FIG. 1;

FIG. 5 is a graph indicating a relationship between an input and an output of the pressure control valve of FIG. 4;

FIG. 26 is a time chart for explaining the booster abnormality braking control routine of FIG. 25.

DETAILED DESCRIPTION OF THE PREFERRED EMBODIMENTS

Figure 1:
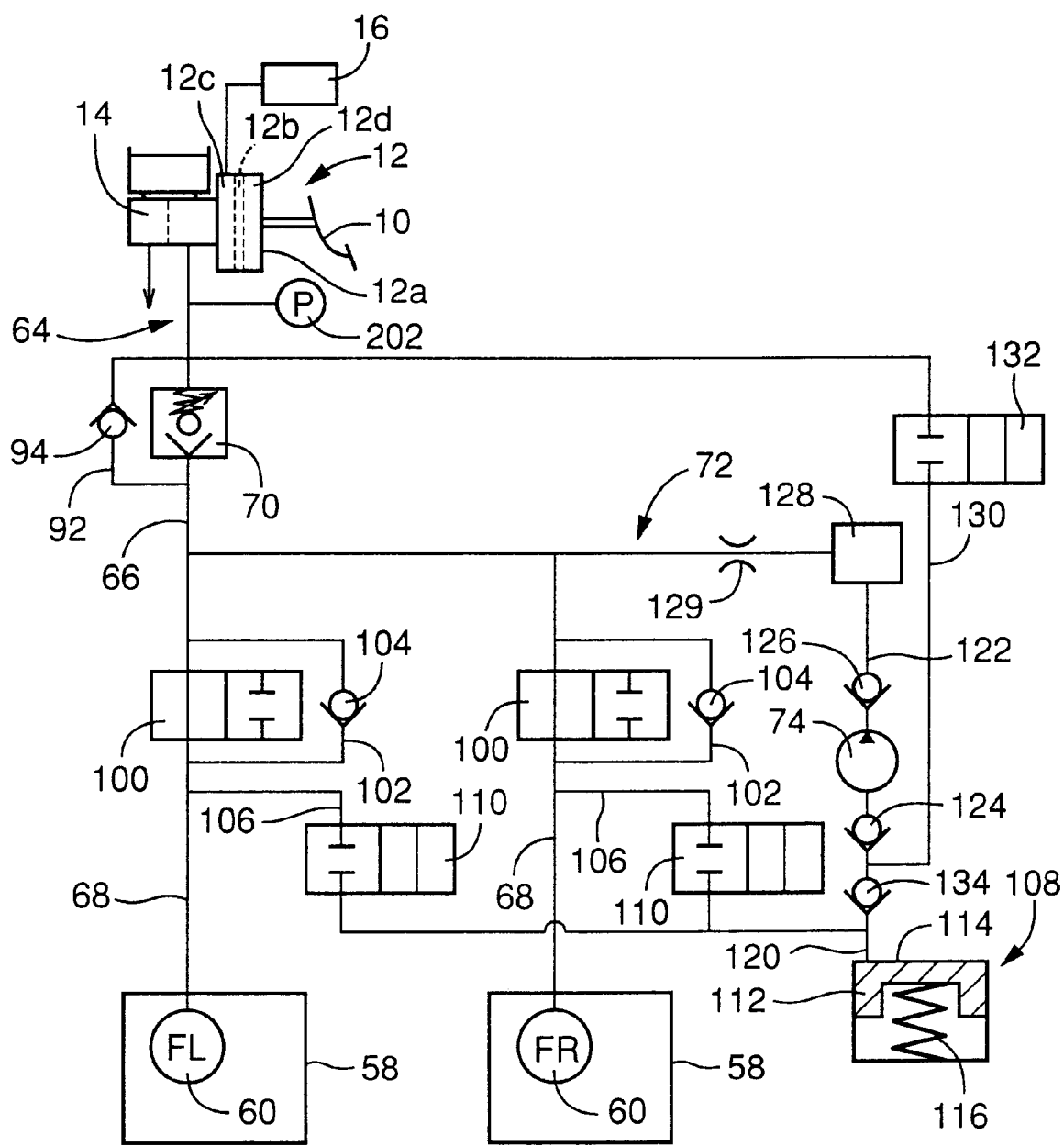
FIG. 1 is a schematic view showing a braking system including a booster abnormality diagnosing apparatus constructed according to a first embodiment of this invention.

Referring first to FIG. 1, the braking system shown therein is arranged for use on a four-wheel automotive vehicle, and is equipped with a booster abnormality diagnosing apparatus constructed according to one embodiment of the present invention. The braking system includes a brake operating member in the form of a brake pedal 10, and a vacuum booster 12 (hereinafter referred to simply as "booster 12") through which the brake pedal 10 is operatively connected to a master cylinder 14.

Since the booster 12 has a construction well known in the art, it will be only briefly explained. The booster 12 has a hollow housing 12a, and includes a power piston 12b which is accommodated in the housing 12a. The power piston 12b cooperates with the housing 12a to define a negative-pressure chamber 12c on the side of the master cylinder 14, and a variable-pressure chamber 14d on the side of the brake pedal 10. The negative-pressure chamber 14c is connected to a negative air pressure source in the form of an intake pipe 16 of an engine of the automotive vehicle. The variable-pressure chamber 14d is selectively communicated with the negative-pressure chamber 14c and the atmosphere.

The master cylinder 14, which has a construction well known in the art, will also be explained only briefly. The master cylinder 14 is a tandem type hydraulic cylinder including a housing, and two pressurizing pistons which are slidably received in the housing, in series with each other. The pressurizing pistons cooperate with the housing to define two mutually independent pressurizing chambers in front of the respective pressurizing chambers. The master cylinder 14 is arranged to mechanically produce substantially equal hydraulic pressures in the two pressurizing chambers, depending upon a brake operating force, namely, a force acting on the brake pedal 10.

Figure 2:
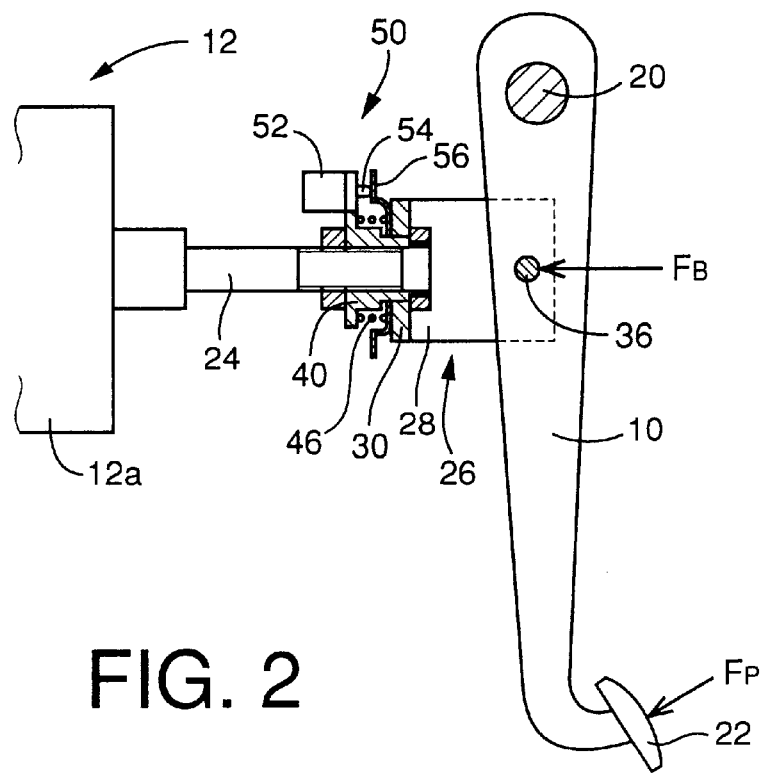
FIG. 2 is a fragmentary side elevational view in cross section showing in enlargement a brake pedal, an input rod of a booster, and a mechanism connecting the brake pedal and the input rod.

Referring next to FIG. 2, there are shown a structure for supporting the brake pedal 10, and a mechanism which operatively connects the brake pedal 10 and the booster 12 to each other.

The brake pedal 10 is connected at its fixed end portion thereof to the vehicle body via a pin 20, such that the brake pedal 10 is pivotable about the axis of the pin 20. The brake pedal 10 has a pedal pad 22 fixed at its free end, so that the brake operating force $F_P$ (pedal depression force) is applied to the pedal pad 22 when the brake pedal 10 is depressed at the pedal pad 22 by the vehicle operator.

The brake pedal 10 is connected at a longitudinally intermediate portion thereof to an input rod 24 of the booster 12. A booster input force $F_B$ which is transmitted from the brake pedal 10 to the input rod 24 of the booster 12 is represented by an equation, $F_B = F_P \times R_P$, wherein "$R_P$" represents the boosting ratio (lever ratio) of the brake pedal 10.

The input rod 24 projects from the housing 12a of the booster 12 toward the brake pedal 10, and is connected, at its end portion remote from the housing 12a, to the brake pedal 10 through a clevis 26. As shown in the enlarged plan view of FIG. 3, the clevis 26 is a generally U-shaped structure consisting of a pair of side plates 28, 28 which are spaced apart from each other in a direction perpendicular to the axis of the input rod 24, and a base plate 30 connecting the two side plates 28, 28 at their corresponding ends. The two side plates 28, 28 have respective first pin holes 32, 32 which are concentric with each other in the above-indicated direction. On the other hand, the brake pedal 10 has a second pin hole 34 formed through its longitudinally intermediate portion. A pin 36 extends through the first pin holes 32, 32 and the second pin hole 34, whereby the clevis 26 is connected to the brake pedal 10 such that the clevis 26 and the brake pedal 10 are pivotable relative to each other about the axis of the pin 36. The first pin holes 32, 32 and the second pin hole 34 are all round holes having a diameter slightly larger than the diameter of the pin 36, so that a relative movement of the brake pedal 10 and the clevis 26 in the axial direction of the input rod 24 is substantially prevented.

The base plate 30 is connected to the end portion of the input rod 24 through a connecting member 40. The connecting member 40 is fixed to the input rod 24, and includes a first stop 42, a second stop 44, and an engaging portion located between the first and second stops 42, 44. The engaging portion slidably engages an opening formed through the base plate 30, so that the connecting member 40 is axially movable relative to the base plate 30 of the clevis 26, over a maximum distance determined by abutting contacts of the first and second stops 42, 44 with the base plate 30. The first stop 42 is brought into abutting contact with the base plate 30 when the clevis 26 and the input rod 24 are moved toward each other, while the second stop 44 is brought into abutting contact with the base plate 30 when the clevis 36 and the input rod 24 are moved away from each other.

A compression coil spring 46 is disposed between the base plate 30 and the connecting member 40, so that the base plate 30 and the connecting member 40 are normally biased in opposite axial directions away from each other, under a predetermined biasing force of the spring 46. Accordingly, the second stop 44 is normally held in abutting contact with the base 30.

Figure 3:
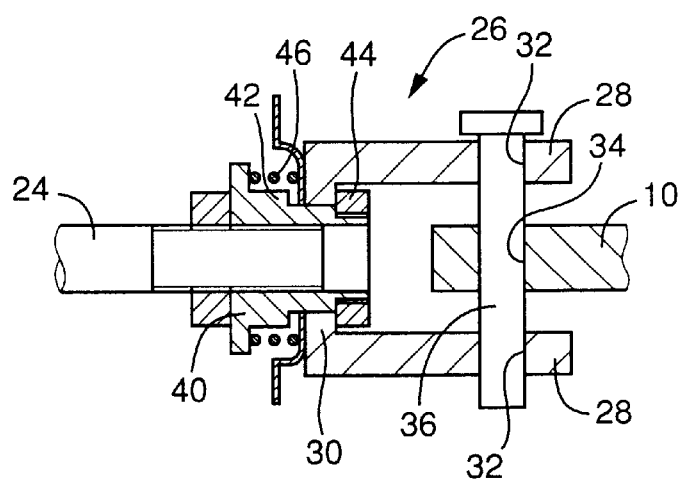
FIG. 3 is a fragmentary cross sectional plan view showing in enlargement a portion of the mechanism of FIG. 2.

Referring back to FIG. 2, the connecting member 40 carries a pedal depression force switch 50 attached thereto. The switch 50 includes a housing 52, and a movable member 54 extending from the housing 52 toward the brake pedal 10. The switch 50 is attached to the connecting member 40 such that the axis or centerline of the movable member 54 is parallel to the axis of the connecting member 40, and such that the movable member 54 is engageable at its free end with a bracket 56 fixed to the base plate 30. The switch 50 is arranged and positioned so that the switch 50 is in an OFF state when the second stop 44 is in contact with the base plate 30 as shown in FIG. 3, and is brought into an ON state when the clevis 26 (base plate 30) has moved a predetermined distance toward the input rod 24 (first stop 42) from the position at which the switch 50 is in the OFF state (at which the second stop 44 is in contact with the base plate 30). When the clevis 26 has moved the predetermined distance toward the input rod 24, the pedal depression force $F_P$ has been increased to a preset value $F_{PS}$ at or above which the diagnosis of the booster 12 is effected, as is apparent from the following description.

The pedal depression force $F_P$ can be transmitted from the clevis 26 to the input rod 24 through the connecting member 40, more precisely, through the abutting contact of the base plate 30 with the first stop 42, only after the base plate 30 is brought into contact with the first stop 42. Since the force $F_P$ is transmitted from the clevis 26 to the input rod 24 through the first stop 42, the switch 50 is protected against exposure to an excessively large force during operation of the brake pedal 10.

The present braking system has two sub-systems, one of which includes two hydraulically operated brakes 58 for front wheels FL, FR shown in FIG. 1, and the other of which includes two hydraulically operated brakes for rear wheels (not shown). The two brakes 58 include respective front wheel brake cylinders 60 for braking the respectively front left and rear wheels FL, FR. These front wheel brake cylinders 60 are connected to one of the two pressurizing chambers of the master cylinder 14. The brakes for the rear wheels include respective rear wheel brake cylinders (not shown) which are connected to the other pressurizing chamber of the master cylinder 14. Since the front and rear sub-systems are substantially identical in construction with each other, only the front sub-system for the front wheels FL, FR will be described by reference to FIG. 1, by way of example.

The master cylinder 14 is connected through a main fluid passage 64 to the wheel brake cylinders 60 for the front left and rear wheels FL, FR. The main fluid passage 64 consists of a common passage 66 extending from the master cylinder 14, and two branch passages 68 extending from the end of the common passage 66 which is remote from the master cylinder 14. A pressure control valve 70 is connected to the common passage 66. The branch passages 68 are connected, at their ends remote from the common passage 66, to the respective wheel brake cylinders 60. A pump passage 72 is connected to a portion of the main fluid passage 64 between the pressure control valve and the wheel brake cylinders 60. A pump 74 is connected to the pump passage 72.

FIGS. 4A and 4B show the pressure control valve 70 in enlargement. The pressure control valve 70 is adapted to electromagnetically control a difference between the hydraulic pressure in the master cylinder 14 and the hydraulic pressure in the wheel brake cylinders 60. The pressure control valve 70 includes a housing, and a valve member 80 and a valve seat 82 which cooperate with each other to control fluid communication between the portions of the main fluid passage 64 on the opposite sides of the valve 70. The valve 70 further includes a solenoid coil 84 which is energized to generate a magnetic force for controlling a relative movement of the valve member 80 and the valve seat 82.

While the solenoid coil 84 of this pressure control valve 70 is in a non-energized or OFF state as shown in FIG. 4A, the valve member 80 is held apart from the valve seat 82 under a biasing force of a spring 86, so that the working fluid is permitted to flow through the main fluid passage 64 in the opposite directions. When the brake pedal 10 is operated in this OFF state, the pressure in the wheel brake cylinders 60 changes with the pressure in the master cylinder 14 (master cylinder pressure $P_{MC}$) During an operation of the brake pedal 10, a force acts on the valve member 80 so as to move the valve member 80 away from the valve seat 82, so that the valve member 80 is prevented from being seated on the valve seat 82, even when the master cylinder pressure $P_{MC}$ and the pressure in the wheel brake cylinders 60 are increased, provided that the solenoid coil 84 is kept in the OFF or non-energized state. Thus, the pressure control valve 70 is a normally open solenoid-operated valve.

In an energized or ON state of the solenoid coil 84 as shown in FIG. 4B, a magnetic force generated by the coil 84 moves an armature 88 toward the valve seat 82 so that the valve member 80 serving as a movable member movable with the armature 88 is moved so as to be seated on the valve seat 82 which serves as a stationary member. At this time, the magnetic force F1 acts on the valve member 80 in the direction toward the valve seat 82, while a sum of a force F2 based on the difference between the pressures in the master cylinder 14 and the wheel brake cylinders 60 and a biasing force F3 of the spring 86 acts on the valve member 80 in the opposite directions away from the valve seat 82. The force F2 is equal to a product of the above-indicated pressure difference (of the master cylinder 14 and the wheel brake cylinders 60) and an effective pressure-receiving surface of the valve member 80 which receives the wheel brake cylinder pressure.

While the solenoid coil 84 is energized and while the operating condition of the braking system satisfies an equation $F2 \leq F1-F3$ with the delivery pressure of the pump 74 being relatively low (with the wheel brake cylinder pressure being relatively low), the valve member 80 is held seated on the valve seat 82, and the fluid delivered from the pump 74 is prevented from flowing to the master cylinder 14, so that the delivery pressure of the pump 74 is increased, and the pressure in the wheel brake cylinders 60 is raised to a level higher than the pressure $P_{MC}$ in the master cylinder 14.

While the operating condition of the braking system satisfies an equation $F2>F1-F3$ with the delivery pressure of the pump 74 being increased (with the wheel brake cylinder pressure being increased), the valve member 80 is moved away from the valve seat 82, and the fluid delivered from the pump 74 is permitted to flow to the master cylinder 14, thereby preventing a further rise of the delivery pressure of the pump 74, namely, a further increase of the pressure of the wheel brake cylinders 60. Thus, the pressure in the wheel brake cylinders 60 is controlled by the pressure control valve 70 such that the pressure in the wheel brake cylinders 60 is higher than that in the master cylinder 14 by an amount corresponding to the magnetic force F1 generated by the solenoid coil 84, if the biasing force F3 is ignored.

The pressure control valve 70 is designed such that the magnetic force F1 generated by the coil 84 changes linearly with an energization current I applied to the coil 84, as indicated in the graph of FIG. 5.

A by-pass passage 92 is provided so as to by-pass the pressure control valve 70, as shown in FIG. 1. A by-pass valve 94, which is a check valve, is provided in the by-pass passage 92, so as to permit a flow of the fluid from the master cylinder 14 toward the wheel brake cylinders 60, even in the event of closure of the pressure control valve 70 due to mechanical locking or sticking of the armature 88 of the valve 70 or for any other reason, during an operation of the brake pedal 10.

In a portion of each branch passage 68 between the wheel brake cylinder 60 and a point of connection thereof to the pump passage 72, there is provided a pressure holding valve 100, which is a normally open solenoid-operated shut-off valve. When the solenoid coil of this pressure holding valve 100 is energized, the valve 100 is closed, preventing flows of the fluid from the wheel brake cylinder 60 toward the master cylinder 14 and the pump 74, to thereby hold the pressure of the wheel brake cylinder 60 at the present level. A by-pass passage 102 is provided so as to by-pass the pressure holding valve 100 in each branch passage 68, and a by-pass valve 102 which is a check valve is provided in the by-pass passage 102.

This by-pass valve 104 functions to permit a high rate of flow of the fluid from the wheel brake cylinder 60 back to the master cylinder 14 when the brake pedal 10 is released.

A reservoir passage 106 is connected at its one end to a portion of each branch passage 68 between the pressure holding valve 100 and the wheel brake cylinder 60, and at the other end to a reservoir 108. To each reservoir passage 106, there is connected a pressure reducing valve 110 which is a normally closed solenoid-operated shut-off valve. The pressure reducing valve 110 is placed in its open position when its solenoid coil is energized. In the open position, the valve 110 permits a flow of the working fluid from the wheel brake cylinder 60 toward the reservoir 108, for thereby reducing the pressure in the wheel brake cylinder 60.

The reservoir 108 includes a housing, and a reservoir piston 112 substantially fluid-tightly and slidably received within the housing. The reservoir piston 112 cooperates with the housing to define a reservoir chamber 114, and is biased by a spring 116 so that the working fluid is stored in the reservoir chamber 114 under pressure. The reservoir chamber 114 is connected through the pump passage 72 to the main fluid passage 64.

The pump passage 72 is divided by the pump 74 into a suction passage 120 and a delivery passage 122. A suction valve 124 and a delivery valve 126, which are both check valves, are provided in the respective suction and delivery passages 120, 122. Further, a damper 128 and an orifice 129 are provided in the delivery passage 122, in series connection with each other, for the purpose of reducing pressure pulsation of the fluid delivered from the pump 74.

A fluid supply passage 130 is connected at its one end to a portion of the suction passage 120 between the suction valve 124 and the reservoir 108, and at the other end to a portion of the main fluid passage 64 between the master cylinder 14 and the two-position valve 70. An inflow control valve 132, which is a normally closed solenoid-operated shut-off valve, is provided in the fluid supply passage 130. The inflow control valve 132 is controlled by an electronic control unit 200 (which will be described), such that the valve 132 is placed in the closed position when the pump 74 is required to pump up the fluid from the reservoir 108 while the pumping of the fluid supplied from the master cylinder 14 should be avoided, and such that the valve 132 is opened when the pump 74 is required to pump up the fluid from the master cylinder 14. A check valve 134 is provided in a portion of the suction passage 120 between the reservoir 108 and a point of connection of the suction passage 120 and the fluid supply passage 130. This check valve 134 functions to inhibit a flow of the fluid from the master cylinder 14 toward the reservoir 108 while the inflow control valve 132 is in the open position. Thus, the check valve 134 permits the pressurized fluid from the master cylinder 14 to be supplied to the pump 74, without a drop of the fluid pressure. It is noted that the reservoir passage 106 is connected to a portion of the suction passage 120 between the check valve 134 and the reservoir 108.

The inflow control valve 132 has a passage through which the fluid flows when the valve 132 is open. In this passage, there is provided an orifice or flow restrictor (not shown), which prevents the master cylinder 14 from being exposed to a pulsation of the fluid generated by intermittent action of the pump 74 to suck the fluid from the master cylinder 14 through the inflow control valve 132.

Figure 6:
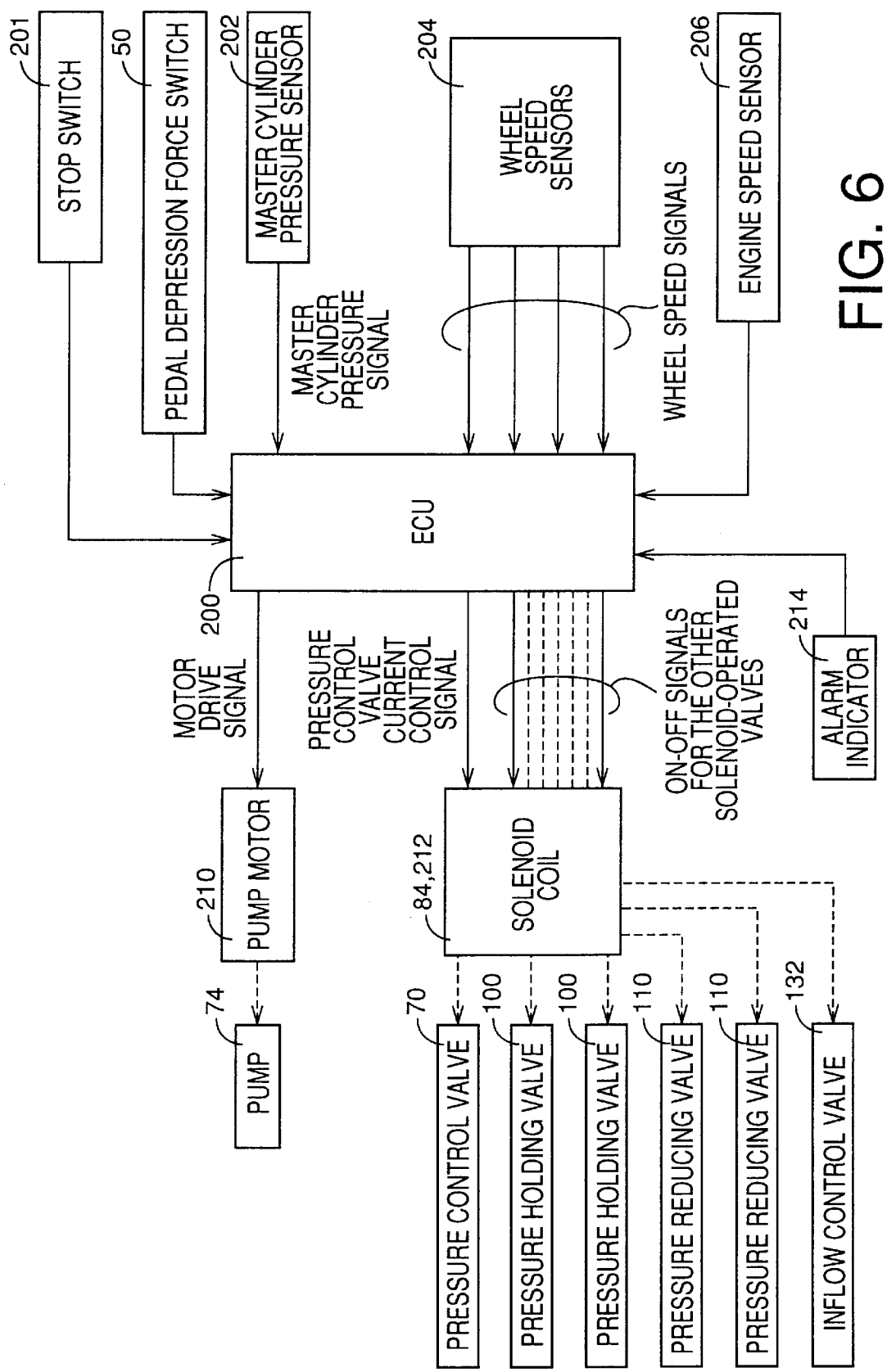
FIG. 6 is a block diagram showing an electrical arrangement of the braking system of FIG. 1.

While the hardware or mechanical arrangement of the present braking system has been described, a software arrangement of the braking system will be described by reference to the block diagram of FIG. 6, which shows only the sub-system for braking the front wheels FL, FR, by way of example.

As indicated above, the present braking system includes the electronic control unit (abbreviated as "ECU" in FIG. 6) 200, which is principally constituted by a computer incorporating a central processing unit (CPU), a read-only memory (ROM) and a random-access memory (RAM). The electronic control unit 200 is adapted to execute a booster abnormality braking control routine and an anti-lock braking pressure control routine, according to control programs stored in the ROM, while utilizing a temporary data storage function of the RAM. The term "booster abnormality braking control" is interpreted to mean diagnosing the booster 12 for any abnormality, warning the vehicle operator of the presence of an abnormality if detected, and activating the pump 74 for applying a pressure to the wheel brake cylinders 60, so as to reduce a decrease in the braking effect which results from the abnormality of the booster 12. The term "anti-lock braking pressure control" is interpreted to mean controlling the pressure in the wheel brake cylinder 50 for each wheel, so as to prevent an excessive locking tendency of the wheel during an operation of the brake pedal 10. In the present embodiment, the working fluid is recirculated through the braking circuit, by operation of the pump 74 while the braking system is operated in an anti-lock braking pressure control mode, namely, while the anti-lock braking pressure control routine is executed. The braking system is adapted to effect the booster abnormality braking control by utilizing the pump 74 during an operation of the brake pedal 10. Thus, the present embodiment utilizes the pump 74 for not only the booster abnormality braking control, but also the anti-lock braking pressure control.

To the input side of the electronic control unit 200, there are connected the pedal depression force switch 50, a stop switch 201, a master cylinder pressure sensor 202, wheel speed sensors 204 and an engine speed sensor 206. The stop switch 201 is one form of a sensor for detecting an operation of the brake pedal 10 by the vehicle operator. When the brake pedal 10 is in the non-operated position, the stop switch 201 generates an OFF signal. When the brake pedal 10 is in an operated position, the stop switch 201 generates an ON signal. The master cylinder pressure sensor 202 is provided to detect the pressure in the master cylinder 14 or in any other portion of the braking system at which the pressure is substantially equal to the pressure in the master cylinder 14. The wheel speed sensors 204 are provided for detecting the rotating speeds of the respective four wheels of the automotive vehicle. Each sensor 204 generates an output signal indicative of the rotating speed of the corresponding wheel. The engine speed sensor 206 is an example of a sensor for detecting whether the vehicle engine is operating or at rest. When the engine is at rest, the output signal of the engine speed sensor 206 indicates that the engine speed is zero. When the engine is operating, the output signal of the sensor 206 represents the rotating speed of the engine.

To the output side of the electronic control unit 200, there are connected an electric motor 210 for driving the pump 74. The driver circuit of the pump motor 210 receives a motor drive signal from the electronic control unit 200. To the output side of the electronic control unit 200, there are also connected the solenoid coil 84 of the pressure control valve 70 and solenoid coils 212 of the pressure holding valves 100, pressure reducing valves 110 and inflow control valve 132. The solenoid coil 84 is energized according to a current control signal received from the electronic control unit 200, such that the magnetic force F1 generated by the coil 84 is linearly proportional with the amount of the electric current I. The solenoid coils 212 are energized according to ON/OFF drive signals also received from the electronic control unit 200. Also connected to the output side of the control unit 200 is an alarm indicator 214 for warning the vehicle operator of the presence of an abnormality of the booster 12.

Referring next to the flow charts of FIGS. 7–10, there will be described the booster abnormality braking control routine for effecting the booster abnormality braking control. First, the routine is briefly explained.

To execute the booster abnormality braking control routine, the electronic control unit 200 incorporates a first determining portion, a second determining portion, a third determining portion and a fourth determining portion, which cooperate to determine whether the booster 12 is abnormal or not. These determining portions will be described one by one.

(1) First Determining Portion

The first determining portion uses an ABNORMALITY flag stored in the RAM of the control unit 200. The ABNORMALITY flag is set at "0" while the booster 12 is in the normal condition, and "1" while the booster is in an abnormal condition. The first determining portion obtains the master cylinder pressure $P_{MC}$ when or after the pedal depression force switch 50 is turned from OFF to ON while the ABNORMALITY flag is set at "0", and determines whether the obtained master cylinder pressure $P_{MC}$ is lower than a first threshold value $P_{th1}$. If the master cylinder pressure $P_{MC}$ is lower than the first threshold value $P_{th1}$, the first determining portion makes a provisional decision that the booster 12 is abnormal.

Figure 11:
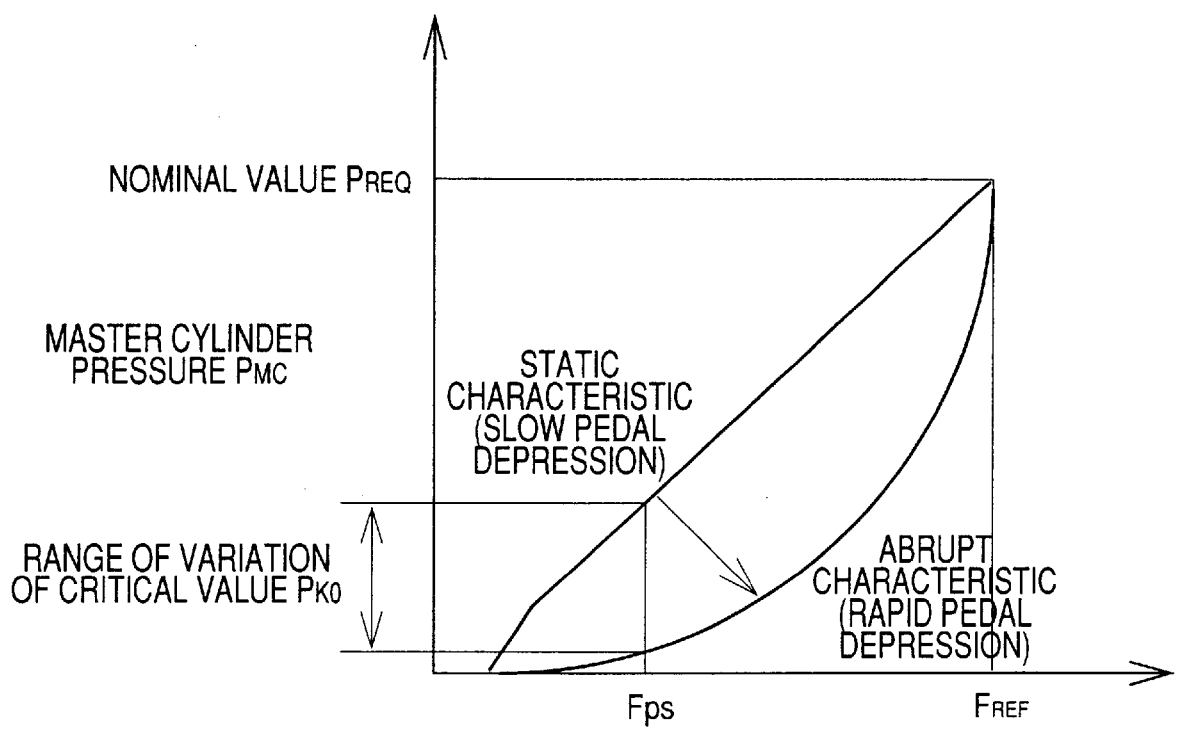
FIG. 11 is a graph indicating a static characteristic and an abrupt brake pedal depression characteristic of a vacuum booster provided in the braking system of FIG. 1.

The first threshold value $P_{th1}$ is determined in the following manner:

In the present embodiment, the booster abnormality braking control employs a design concept wherein the booster 12 is diagnosed when the brake pedal depression force $F_P$ is at a reference value $F_{REF}$ not smaller than the preset value $F_{PS}$ previously indicated in connection with the pedal depression force switch 50. Explained more specifically referring to the graph of FIG. 11, the booster 12 is diagnosed to be normal if the master cylinder pressure $P_{MC}$ when the brake pedal depression force $F_P$ is at the reference value $F_{REF}$ is not lower than a predetermined nominal value $P_{REQ}$, provided that the brake pedal 10 is depressed slowly enough to assure a substantially linear increase of the master cylinder pressure $P_{MC}$ with an increase in the pedal depression force $F_P$. In FIG. 11, this substantially linear increase is indicated as "static characteristic" of the booster 12. However, the brake pedal 10 may be depressed abruptly or rapidly as indicated by a curve in FIG. 11, as "abrupt characteristic" of the booster 12.

When the brake pedal 10 is depressed slowly, the negative pressure in the negative-pressure chamber 12c is kept almost constant. When the brake pedal 10 is depressed rapidly, the negative pressure (absolute value) is reduced, and the introduction of the atmosphere into the variable-pressure chamber 12c is more or less delayed. The reduction of the negative pressure in the negative-pressure chamber 12c and the delayed introduction of the atmosphere into the variable-pressure chamber 12d both cause a decrease in the pressure difference between the negative-pressure and variable-pressure chambers 12c, 12d. Accordingly, the master cylinder pressure $P_{MC}$ at a given value of the pedal depression force $F_P$ is lower when the brake pedal 10 is depressed relatively rapidly than when it is depressed relatively slowly, as is apparent from the graph of FIG. 11. The master cylinder pressure $P_{MC}$ is of course lower when the booster 12 is abnormal than when it is normal, but the master cylinder pressure $P_{MC}$ is also lower when the brake pedal 10 is depressed rapidly than when it is depressed slowly. For accurately diagnosing the booster 12 for an abnormality, it is necessary to take into account a change in the operating characteristic of the booster 12 in connection with a speed $V_P$ at which the brake pedal 10 is depressed.

On the other hand, the depression speed $V_P$ of the brake pedal 10 is reflected on a rate of rise $dP_{MC}/dt$ of the master cylinder pressure $P_{MC}$. Namely, the rate of rise $dP_{MC}/dt$ increases with an increase in the depression speed $V_P$.

Figure 12:
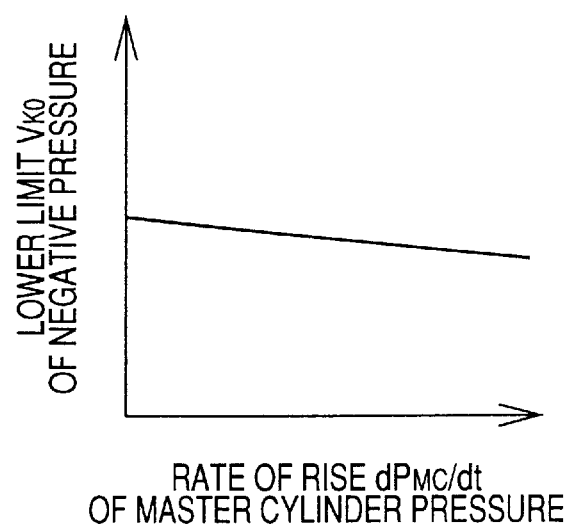
FIG. 12 is a graph indicating a relationship between a rate of rise $dP_{MC}/dt$ and a lower limit $V_{K0}$ of a master cylinder pressure in the vacuum booster.

A graph of FIG. 12 indicates that a lower limit $V_{K0}$ of a range of variation of the negative pressure in the negative-pressure chamber 12c of the booster 12 in the normal condition decreases with an increase in the rate of rise $dP_{MC}/dt$ of the master cylinder pressure $P_{MC}$.

Figure 13:
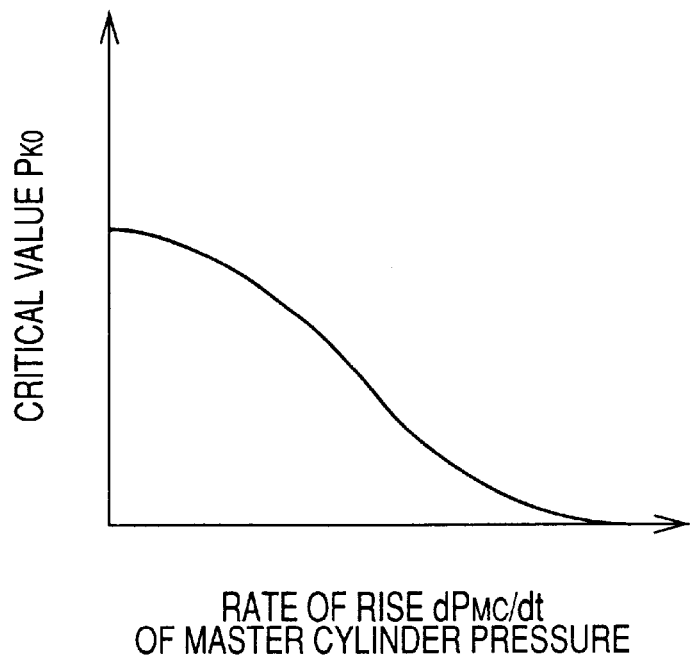
FIG. 13 is a graph indicating a relationship between the rate of rise $dP_{MC}/dt$ and a critical value $P_{K0}$ of the master cylinder pressure in the vacuum booster.

The first determining portion is adapted, for example, to determine that the booster 12 is abnormal, if the master cylinder pressure $P_{MC}$ when the pedal-depression force $F_P$ is at the preset value $F_{PS}$ is lower than the first threshold value $P_{th1}$. This first threshold value $P_{th1}$ is not a fixed constant value, but is a variable which changes with the pedal depression speed $V_P$, namely, with the rate of rise $dP_{MC}/dt$ of the master cylinder pressure $P_{MC}$. A graph of FIG. 13 indicates that a critical value $P_{K0}$ of the master cylinder pressure $P_{MC}$ above and below which the booster 12 is diagnosed to be normal and abnormal, respectively, at a given value of the brake pedal depression force $F_P$, decreases with an increase in the rate of rise $dP_{MC}/dt$ of the master cylinder pressure $P_{MC}$, since this critical value $P_{K0}$ corresponds to the lower limit $V_{K0}$ of the range of variation of the negative pressure in the negative-pressure chamber 12c. A range of variation of the critical value $P_{K0}$ is indicated in the graph of FIG. 11.

Figure 14:
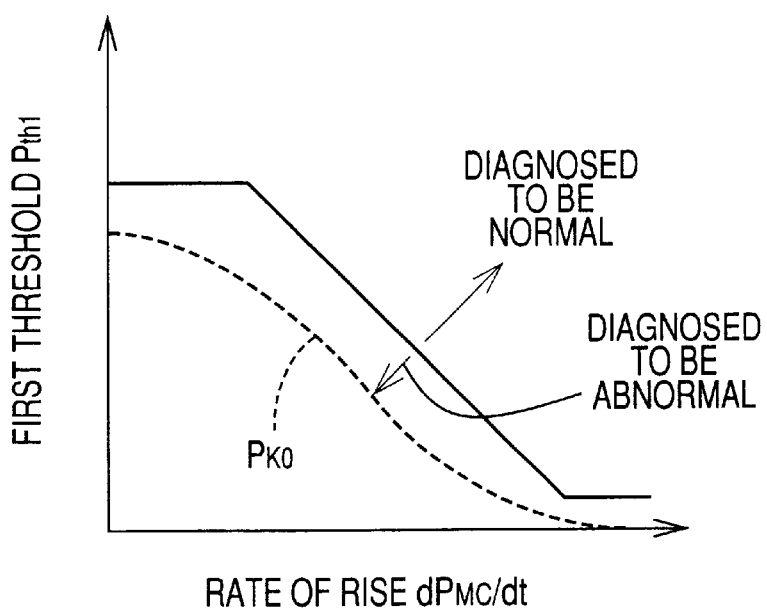
FIG. 14 is a graph indicating a relationship between the rate of rise $dP_{MC}/dt$ and a first threshold value $P_{th1}$ of the master cylinder pressure in the vacuum booster.

The critical value $P_{K0}$ indicated above may be used as the first threshold value $P_{th1}$. In this case, however, the booster 12 which is actually abnormal may be erroneously diagnosed to be normal, when the negative pressure (absolute value) in the negative-pressure chamber 12c is actually lower than the lower limit $V_{K0}$. This erroneous diagnosis may be caused by various factors such as: a rise of the actual master cylinder pressure $P_{MC}$ above a level corresponding to the lower limit $V_{K0}$, due to a variation in the delay of the operating response of the booster 12; and a detected value of the master cylinder pressure $P_{MC}$ which is higher than the actual value, due to a variation in the output signal of the master cylinder pressure sensor 202 or the pedal depression force switch 50. To eliminate this erroneous diagnosis, the present embodiment is adapted such that the first threshold value $P_{th1}$ is made higher than the critical value $P_{K0}$, as indicated in FIG. 14.

The pedal depression force switch 50 is used to detect that the pedal depression force $F_P$ has been increased to the preset value $F_{PS}$. To this end, a pre-load $F_{SET}$ of the spring 46 of the switch 50 is set according to the following equation:

$$F_{SET}=F_{PS} \times R_P$$

Since the brake pedal 10 is biased by a return spring (not shown) toward its non-operated position, an actually used value of the pre-load $F_{SET}$ is not equal to a value represented by the above equation, but is smaller than that value by an amount corresponding to an influence of the biasing force of the return spring indicated above.

The preset value $F_{PS}$ of the pedal depression force $F_P$ is determined to be reached when the brake pedal 10 is depressed for a normal or ordinary brake application, as well as when the brake pedal 10 is depressed for an abrupt or emergency brake application. Described in detail, the preset value $F_{PS}$ is determined to be smaller than the force $F_P$ generated when the master cylinder pressure $P_{MC}$ begins to rise from the atmospheric pressure, in the event of a failure of the booster 12 in which the pedal depression force $F_P$ is transferred to the master cylinder 14 without any boosting by the booster 12. For instance, the preset value $F_{PS}$ is selected within a range of 2–10 kgf, preferably set at about 5 kgf.

The first determining portion incorporates a device for compensating the output of the master cylinder pressure sensor 202.

Figure 15:
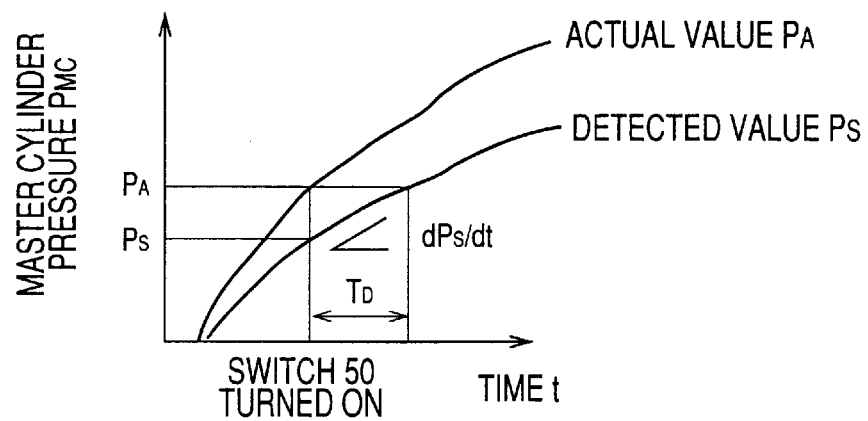
FIG. 15 is a graph indicating an actual value $P_A$ and a detected value $dP_S$ of the master cylinder pressure $P_{MC}$, which vary with the time t.

The output signal of the master cylinder pressure sensor 202 more or less includes an undesirable noise, which may cause an error in the detected master cylinder pressure $P_{MC}$ as represented by the non-compensated output signal of the sensor 202. To remove this error, the output signal of the sensor 202 is smoothed by a filter, and the detected value of the master cylinder pressure $P_{MC}$ is calculated on the basis of the thus smoothed output signal of the sensor 202. On the other hand, the smoothing by the filter tends to lower the sensitivity of the detected value of the master cylinder pressure $P_{MC}$ to a change in the actual value. In other words, the detected value $P_S$ becomes equal to the actual value $P_A$ with a time delay $T_D$, as indicated in the graph of FIG. 15.

If the master cylinder pressure sensor 202 were directly attached to the pressurizing chamber of the master cylinder 14, there would arise substantially no delay in the transfer of a change of the master cylinder pressure $P_{MC}$ to the master cylinder pressure sensor 202. In the present embodiment, the master cylinder pressure sensor 202 is connected to the main fluid passage 64 connecting the master cylinder 14 to a brake actuator module which incorporates the pressure control valve 70, pressure holding valves 100, pressure reducing valves 110, pump 74 and pump motor 210. Therefore, the change of the actual master cylinder pressure $P_{MC}$ is transferred to the master cylinder pressure sensor 202 with a given time delay. Like the smoothing of the output signal of the sensor 202 by the filter, this time delay causes a delay of the detected value $P_S$ with respect to the actual value $P_A$.

In the light of the above fact, an experimentation was conducted to obtain a relationship between the rate of rise $dP_{MC}/dt$ of the master cylinder pressure $P_{MC}$ and a delay time $T_D$ caused by the above-indicated smoothing and the connection of the sensor 202 to the main fluid passage 64. The obtained relationship is indicated in the graph of FIG. 16.

In the present embodiment, the delay time $T_D$ is estimated on the basis of the rate of rise $dP_{MC}/dt$ and according to the obtained relationship between $T_D$ and $dP_{MC}/dt$, and a difference $\Delta P$ between the actual and detected values $P_A$, $P_S$ of the pressure $P_{MC}$ which arises from the delay time $T_D$ is obtained by a product of the estimated delay time $T_D$ and the rate of rise $dP_{MC}/dt$. The detected value PS obtained by smoothing the output signal of the sensor 202 is compensated by adding the obtained difference $\Delta_P$, according to the following equation wherein "$P_C$" represents a compensated value of the pressure $P_{MC}$:

$$P_C=P_S+(dP_{MC}/dt) \times T_D$$

Figure 16:
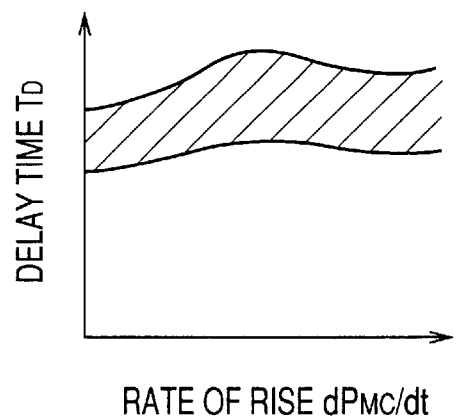
FIG. 16 is a graph indicating a relationship between a delay time $T_D$ in FIG. 15 and the rate of rise $dP_{MC}/dt$, which relationship is obtained by experimentation.
Figure 17:
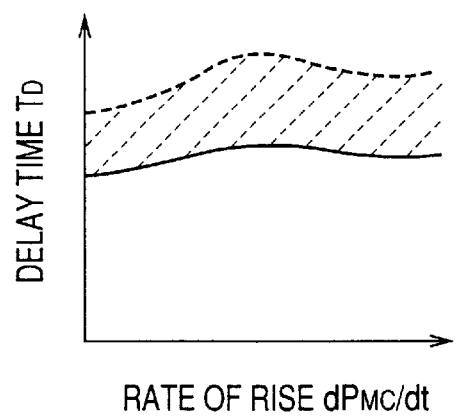
FIG. 17 is a graph indicating a relationship between the delay time $T_D$ in FIG. 15 and the rate of rise $dP_{MC}/dt$, which relationship is stored in a ROM of the computer of the electronic control unit of FIG. 6.

As indicated in FIG. 16, the delay time $T_D$ has some amount of variation corresponding to each instantaneous value of the rate of rise $dP_{MC}/dt$. On the other hand, the compensated value $P_C$ which is higher than the actual value $P_A$ may cause the actually abnormal booster 12 to be erroneously diagnosed to be normal. To eliminate this drawback, the first determining portion of the present embodiment is adapted to use a relationship between the lower limit of the variation of the delay time $T_D$ and the rate of rise $dP_{MC}/dt$, as indicated in the graph of FIG. 17. This relationship is stored in the ROM of the control unit 200, and the delay time $T_D$ is calculated on the basis of the actual rate of rise $dP_{MC}/dt$ and according to the stored relationship.

(2) Second Determining Portion

The second determining portion is adapted to make a final decision as to whether the booster 12 is abnormal, after the first determining portion has made a provisional decision that the booster 12 is abnormal. Described more specifically, the second determining portion determines whether the pedal depression force switch 50 is held in the ON state for a preset time $T_0$ after the switch 50 is turned from OFF to ON. If the switch 50 is held ON for the preset time $T_0$, the second determining portion determines whether the master cylinder pressure $P_{MC}$ at that time is higher than a second threshold value $P_{th2}$. If the pressure $P_{MC}$ is not higher than the second threshold value $P_{th2}$, the second determining portion determines whether a deceleration value G of the automotive vehicle is higher than a reference value $G_0$. If the deceleration value G is not higher than the reference value $G_0$, the second determining portion determines whether the rate of rise $dP_{MC}/dt$ of the master cylinder pressure $P_{MC}$ is higher than a reference value $\Delta P_0$.

If the rate of rise $dP_{MC}/dt$ is not higher than a reference value $\Delta P_0$, the second determining portion makes the final decision that the booster 12 is abnormal, and sets the ABNORMALITY flag to "1". The pump 74 is operated to apply a braking pressure to the wheel brake cylinders 60 if the final decision of the presence of abnormality of the booster 12 is made, that is, if the ABNORMALITY flag is set to "1".

Figure 18:
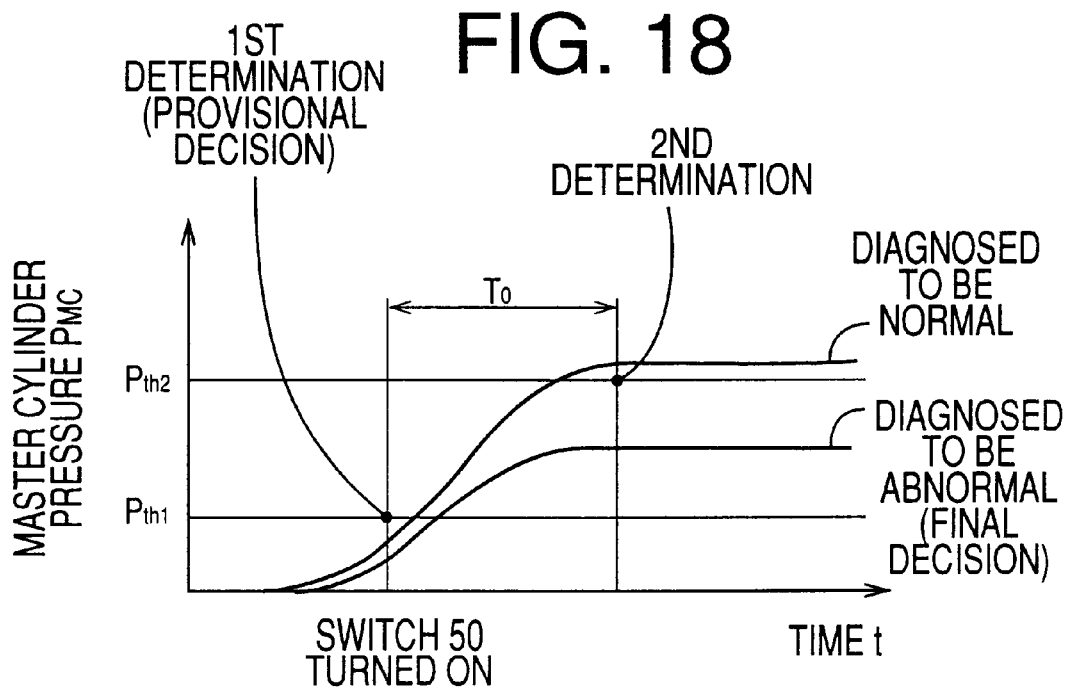
FIG. 18 is a graph indicating a relationship between a first determining portion and a second determining portion in the booster abnormality braking control routine of FIG. 7.

A graph of FIG. 18 shows the first determination (provisional decision) by the first determining portion when the pedal depression force switch 50 is turned ON, and the second determination (final decision) by the second determining portion when the preset time $T_0$ has passed. The preset time T0 is determined to be long enough to assure a sufficiently a high degree of operational stability of the booster 12 and an accordingly high degree of stability of the master cylinder $P_{MC}$ when the preset time $T_0$ has passed after the switch 50 is turned ON, even if the brake pedal 10 is depressed considerably rapidly. The determination of the preset time $T_0$ will be further explained by reference to FIG. 21.

Thus, the second determining portion is adapted to make the final decision that the booster 12 is abnormal, if the master cylinder pressure $P_{MC}$ is not higher than the second threshold value $P_{th2}$, and the other two conditions indicated above are satisfied.

Figure 19:
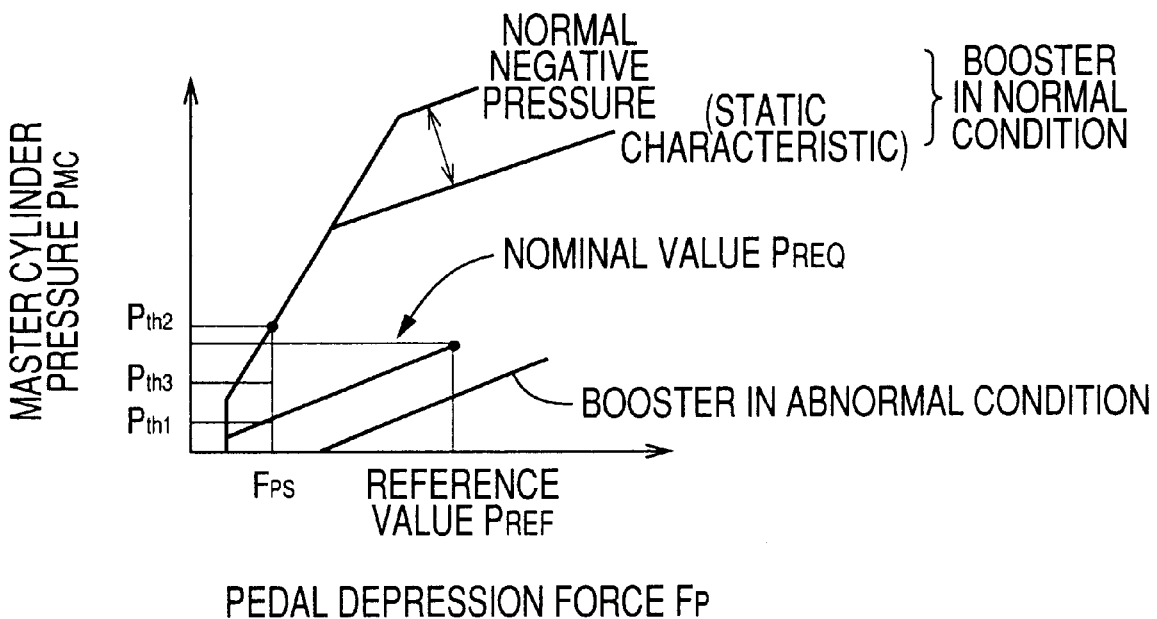
FIG. 19 is a graph indicating a relationship between the static characteristic of the vacuum booster in a normal condition and three threshold values $P_{th1}$, $P_{th2}$ and $P_{th3}$.

The second threshold value $P_{th2}$ is determined in the following manner:

In the present embodiment, the second threshold value $P_{th2}$ is determined to be larger than the first threshold value $P_{th1}$ and also larger than the nominal value $P_{REQ}$ corresponding to the reference value $F_{REF}$ of the pedal depression force $F_P$, as indicated in the graph of FIG. 19. The second threshold value $P_{th2}$ may be smaller than the nominal value $P_{REQ}$, since the booster 12 is normal even if the master cylinder pressure $P_{MC}$ with which the threshold value $P_{th2}$ is compared is lower than the nominal value, when the pedal depression force $F_P$ is smaller than the reference value $F_{REF}$. However, when the brake pedal 10 is rapidly depressed with a comparatively large depression force, the pedal depression force $F_P$ may be rapidly increased up to the reference value $F_{REF}$ in a short time after the pedal depression force switch 50 is turned ON. In the present embodiment wherein the second threshold value $P_{th2}$ is larger than the nominal value $P_{REQ}$, the second determining portion is prevented from making an erroneous final decision that the booster 12 which is actually abnormal is normal.

Then, the preset time $T_0$ will be described in detail.

Figure 20:
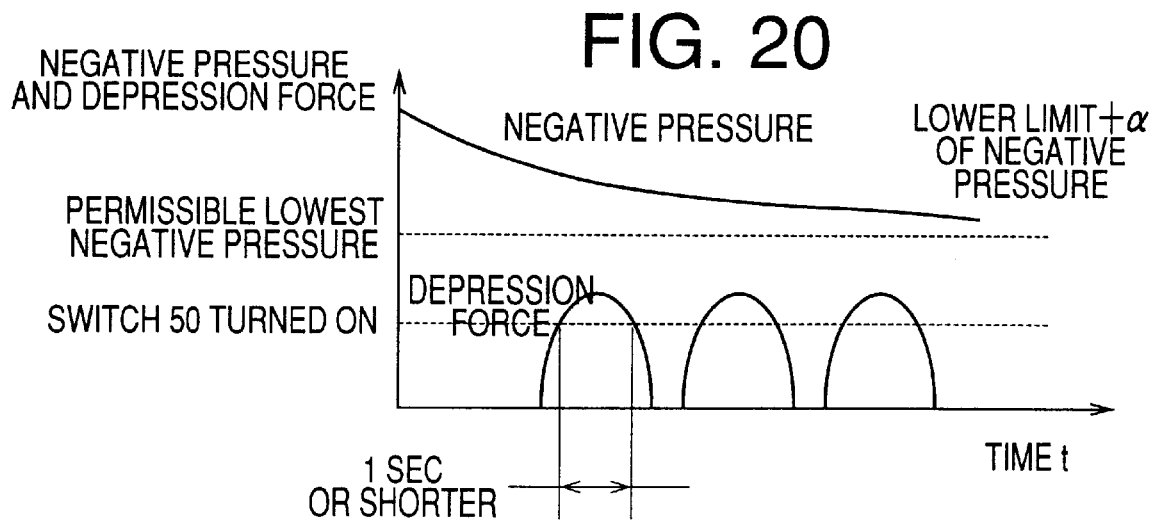
FIG. 20 is a graph showing a timewise drop of the negative pressure in the booster and a switching between ON and OFF states of a pedal depression force switch, when the braking pressure is controlled with an operation of a pump.

When the brake pedal 10 is alternately depressed and released repeatedly in a so-called "pumping" manner, the pedal depression force switch 50 is alternately turned ON and OFF periodically, as indicated in the graph of FIG. 20. In this case, the time period for which the switch 50 is held ON for each depression of the brake pedal 10 is comparatively short, for instance, one second or shorter. Therefore, if the preset time $T_0$ is a fixed constant value determined as described above, the time period for which the switch 50 is held ON for each depression of the brake pedal 10 operated in the pumping manner is shorter than the preset time $T_0$, the second determining portion makes an erroneous final decision that the actually abnormal booster 12 is normal, although the first determining portion has determined a provisional decision that the booster 12 is abnormal. The graph of FIG. 20 also shows a decrease in the negative pressure (absolute value) in the negative chamber 12c.

While the preset time $T_0$ may be a fixed constant value, it is a variable which varies with the vehicle running speed $V_S$, in the present embodiment. Described more particularly referring to FIG. 21, the preset time $T_0$ is longer when the vehicle speed $V_S$ is lower than a reference value $V_0$ (larger than zero), than when the vehicle speed $V_S$ is higher than the reference value $V_0$.

Figure 22:
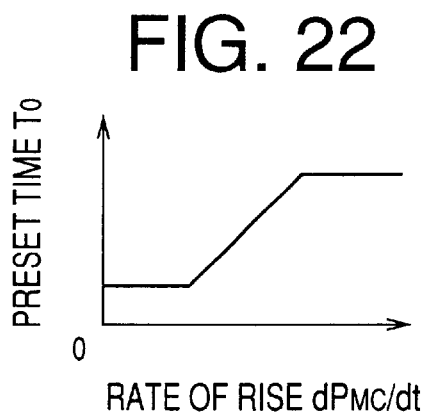
FIG. 22 is a graph indicating a relationship between the preset time $T_0$ and the rate of rise $dP_{MC}/dt$.

It is noted that the preset time $T_0$ may vary with any other parameter relating to an operation of the braking system, such as the rate of rise $dP_{MC}/dt$ of the master cylinder pressure $P_{MC}$. For instance, the preset time $T_0$ increases with an increase in the rate of rise $dP_{MC}/dt$, as indicated in the graph of FIG. 22.

As described above, the second determining portion is adapted to make the final decision that the booster 12 is abnormal, depending upon the results of the three determinations, that is, a first determination as to whether the master cylinder pressure $P_{MC}$ is higher than the second threshold value $P_{th2}$, a second determination as to whether the vehicle deceleration value G is higher than the reference value $G_0$, and a third determination as to whether the rate of rise $dP_{MC}/dt$ of the master cylinder pressure $P_{MC}$ is higher than the reference value $\Delta P_0$. The result of the first determination is dependent solely upon whether the booster 12 is normal or abnormal. On the other hand, the results of the second and third determinations do not directly relate to the normal or abnormal condition of the booster 12, since the negative decisions (indicating the abnormality of the booster 12) are obtained in these second and third determinations when the brake pedal 10 is depressed with a large depression force, irrespective of whether the booster 12 is normal or abnormal. However, it is not so necessary to make the final decision that the booster 12 is abnormal, if the vehicle is actually braked adequately with a sufficiently high deceleration value G of the vehicle, or with a sufficiently high rate of rise of the master cylinder pressure $P_{MC}$. In other words, the second and third determinations whose results do not directly depend upon whether the booster 12 is normal or abnormal are effected to make the final decision that the booster 12 is abnormal, only where the first determination indicates that the booster 12 is abnormal and where the second and third determinations indicate that the vehicle is not adequately braked.

(3) Third Determining Portion

As is apparent from the foregoing description, the second determining portion is operated at a point of time at which the booster 12 has been brought from its transient operating state to its steady operating state. As a result, the booster 12 can be diagnosed as to whether it is normal or abnormal, principally on the basis of the static characteristic of the booster 12. However, there may be a case wherein the booster 12 remains in its transient state at the above-indicated point of time at which the second determining portion is activated. In such a case, the erroneous decision that the actually normal booster 12 is abnormal may be made since the master cylinder pressure $P_{MC}$ is lower than the second threshold value $P_{th2}$, due to the transient operating state of the booster 12. The third determining portion is provided to cancel such an erroneous decision before the next braking operation is initiated.

The third determining portion is adapted to determine whether the booster 12 is normal or abnormal, after the pedal depression force switch 50 or the stop switch 201 is turned from ON to OFF after the second determining portion has made the final decision that the booster 12 is abnormal. If the third determining portion determines that the booster 12 is now normal, the third determining portion cancels the preceding final decision by the second determining portion, and makes a second final decision that the booster 12 is normal. The third determining portion determines that the booster 12 is normal, if the master cylinder pressure $P_{MC}$ is higher than a third threshold value $P_{th3}$.

Figure 23:
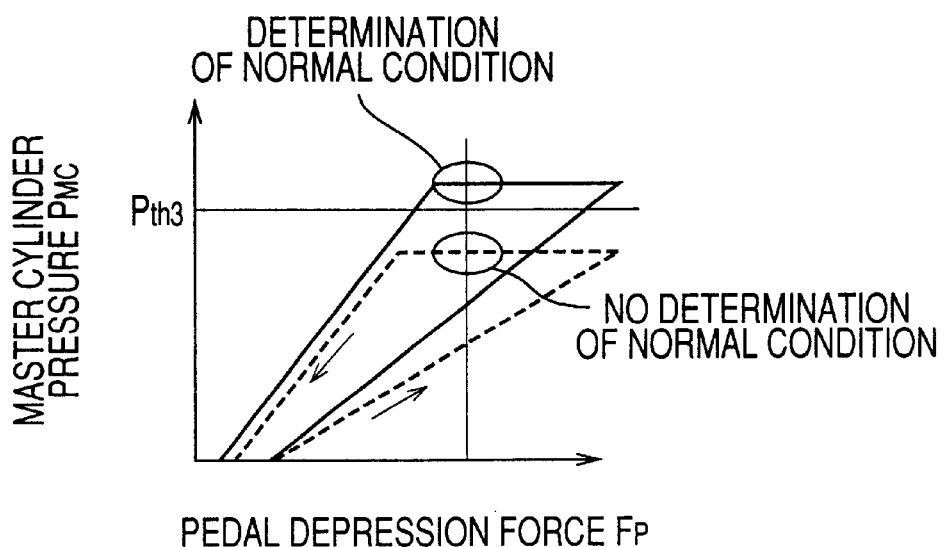
FIG. 23 is a graph for explaining a method of determining the third threshold value $P_{th3}$ in the booster abnormality braking control routine of FIG. 7.

There exists a hysteresis characteristic between the input and output of the booster 12, and therefore there exists a hysteresis characteristic between the pedal depression force $F_P$ and the master cylinder pressure $P_{MC}$ which correspond to the input and output of the booster 12, respectively. FIG. 23 includes two graphs indicated by a solid line and a broken line. These two graphs indicate respective two different hysteresis characteristics between the pedal depression force $F_P$ and the master cylinder pressure $P_{MC}$. The hysteresis characteristic when the negative pressure (absolute value) in the negative-pressure chamber 12c is comparatively high is indicated by the solid line, while that when the negative pressure is comparatively low is indicated by the broken line. Each graph includes three line segments indicating respective time periods in which the master cylinder pressure $P_{MC}$ is raised, held substantially constant and lowered, respectively, which time periods take place in the order of description, as indicated by arrows. In the the master cylinder pressure $P_{MC}$ corresponding to a certain value of the pedal depression force $F_P$ is higher when the master cylinder pressure $P_{MC}$ is held substantially constant or lowered than when it is raised. The master cylinder pressure $P_{MC}$ is held constant at its highest value. In this specific example of FIG. 23, the hysteresis characteristic when the negative pressure is comparatively high is that of the booster 12 which is to be diagnosed to be normal, while the hysteresis characteristic when the negative pressure is comparatively low is that of the booster 12 which is to be diagnosed to be abnormal. It will be understood from the graphs that the third threshold value $P_{th3}$ is determined to be lower than the highest value of the master cylinder pressure $P_{MC}$ when the pressure $P_{MC}$ is held constant where the booster 12 is normal, and higher than the highest value when the pressure $P_{MC}$ is held constant where the booster 12 is abnormal. The third threshold value $P_{th3}$ is determined to be intermediate between the first and third threshold values $P_{th1}$ and $P_{th2}$, as indicated in the graph of FIG. 19.

(4) Fourth Determining Portion

The fourth determining portion is adapted to determine whether the booster 12 is normal or not, when the pedal depression force switch 50 is turned from OFF to ON while the ABNORMALITY flag is set at "1". Described in detail, the fourth determining portion determines that the booster 12 is normal, if the master cylinder pressure $P_{MC}$ is higher than a fourth threshold value $P_{th4}$. In the present embodiment, the fourth threshold value $P_{th4}$ is equal to the first threshold value $P_{th1}$.

If the fourth determining portion determines that the booster 12 is normal, the ABNORMALITY flag is immediately reset to "0". In the case where the fourth determining portion determines that the booster 12 is not normal, the second determining portion is operated. In this case, the function of the fourth determining portion is the same as that of the first determining portion whose provisional decision that the booster 12 is abnormal is followed by the operation of the second determining portion. However, the first determining portion determines that the booster 12 is normal, the first determining portion is operated again, and does not reset the ABNORMALITY flag to "0". On the other hand, the fourth determining portion is not operated again, and resets the ABNORMALITY flag to "0", where the booster 12 is determined to be normal. The first determining portion is operated when the ABNORMALITY flag is set at "0", while the fourth determining portion is operated when the ABNORMALITY flag is set at "1". A comparatively stringent diagnosis of the booster 12 is required to determine that the booster 12 is abnormal when the ABNORMALITY flag is set at "0", in order to prevent application of a braking pressure to the wheel brake cylinders 60 by operation of the pump 74. On the other hand, a comparatively less stringent diagnosis of the booster 12 is required to determine that the booster 12 is normal when the flag is set at "1", so that the application of the braking pressure by operation of the pump 74 can be relatively easily terminated.

Next, there will be described a braking control with an operation of the pump 74 to apply a fluid pressure pressurized by the pump 74 to the wheel brake cylinders 60 when the final decision that the booster 12 is abnormal is made, that is, when the ABNORMALITY flag is set to "1".

Figure 24:
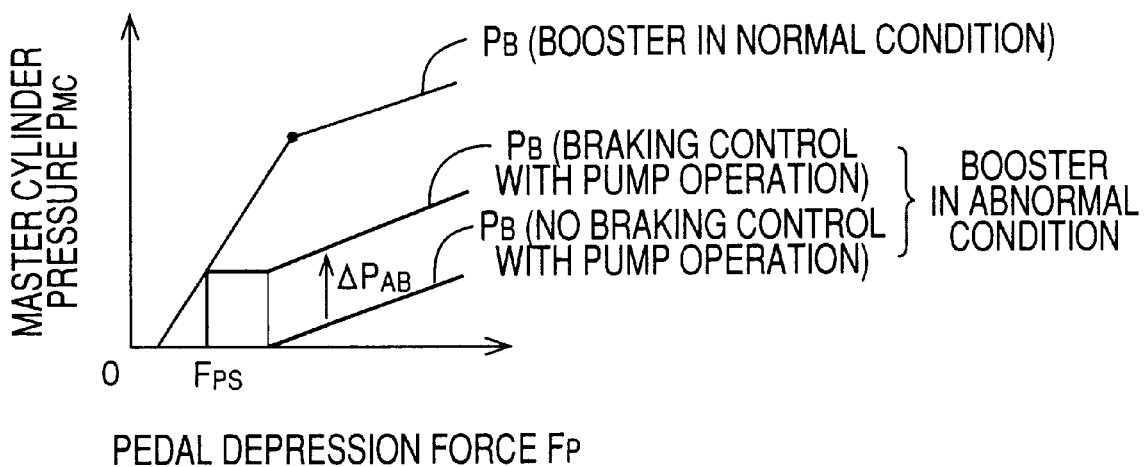
FIG. 24 is a graph for explaining a braking control with an operation of the pump.

To effect the braking control with an operation of the pump 74, the pressure control valve 70 is closed so that the wheel brake cylinders 60 may be activated by the fluid pressure delivered from the pump 74, and the pump 74 is operated. Further, the inflow control valve 132 is opened to permit the fluid to be supplied from the master cylinder 14 to the suction side of the pump 74. The graph of FIG. 24 indicates an increase of the pressure $P_B$ of the wheel brake cylinders 60 when the pump 74 is operated as a result of the final decision that the booster 12 is abnormal, as compared with the wheel brake cylinder pressure $P_B$ when the pump 74 is not operated. Accordingly, the wheel brake cylinder pressure $P_B$ is made higher than the master cylinder pressure $P_{MC}$. This braking control with the operation of the pump 74 is effective to reduce an amount of reduction of the braking effect provided by the braking system when the booster 12 is abnormal. Although an amount of increase $\Delta P_{AB}$ by which the wheel brake cylinder pressure $P_B$ is increased by operation of the pump 74 is a fixed constant value, the amount of increase $\Delta P_{AB}$ may be a variable which varies depending upon the manner of operation of the brake pedal 10, for example, a variable which continuously increases with an increase in the pedal depression force $F_P$ acting on the brake pedal 10.

Referring to the flow charts of FIGS. 7–10, there will next be described in detail the booster abnormality braking control routine to be executed by the electronic control unit 200 incorporating the first through fourth determining portions described above.

The booster abnormality braking control routine is initiated with step S10 (FIG. 7) to determine whether an operation of a pump-pressure application braking device adapted to effect the braking control with operation of the pump 74 is currently permitted. The pump-pressure application braking device is a part of the braking system which functions to apply the fluid pressure delivered by the pump 74 to the wheel brake cylinders 60 when the booster 12 is diagnosed to be abnormal. The pump-pressure application braking device includes the pedal depression force switch 50, the stop switch 201, the master cylinder pressure sensor 202, and an anti-lock braking pressure control device. The anti-lock braking pressure control device, which is adapted to execute the anti-lock braking pressure control routine indicated above, includes the brake actuator module, relays, and wheel speed sensors 204. As described above with respect to the master cylinder pressure sensor 202, the brake actuator module includes the pressure control valve 70, pressure holding valves 100, pressure reducing valves 110, inflow control valve 132, pump 74 and pump motor 210, which are incorporated within the common housing. Major elements of the anti-lock braking pressure control device are used in the pump-pressure application braking device.

Figure 7:
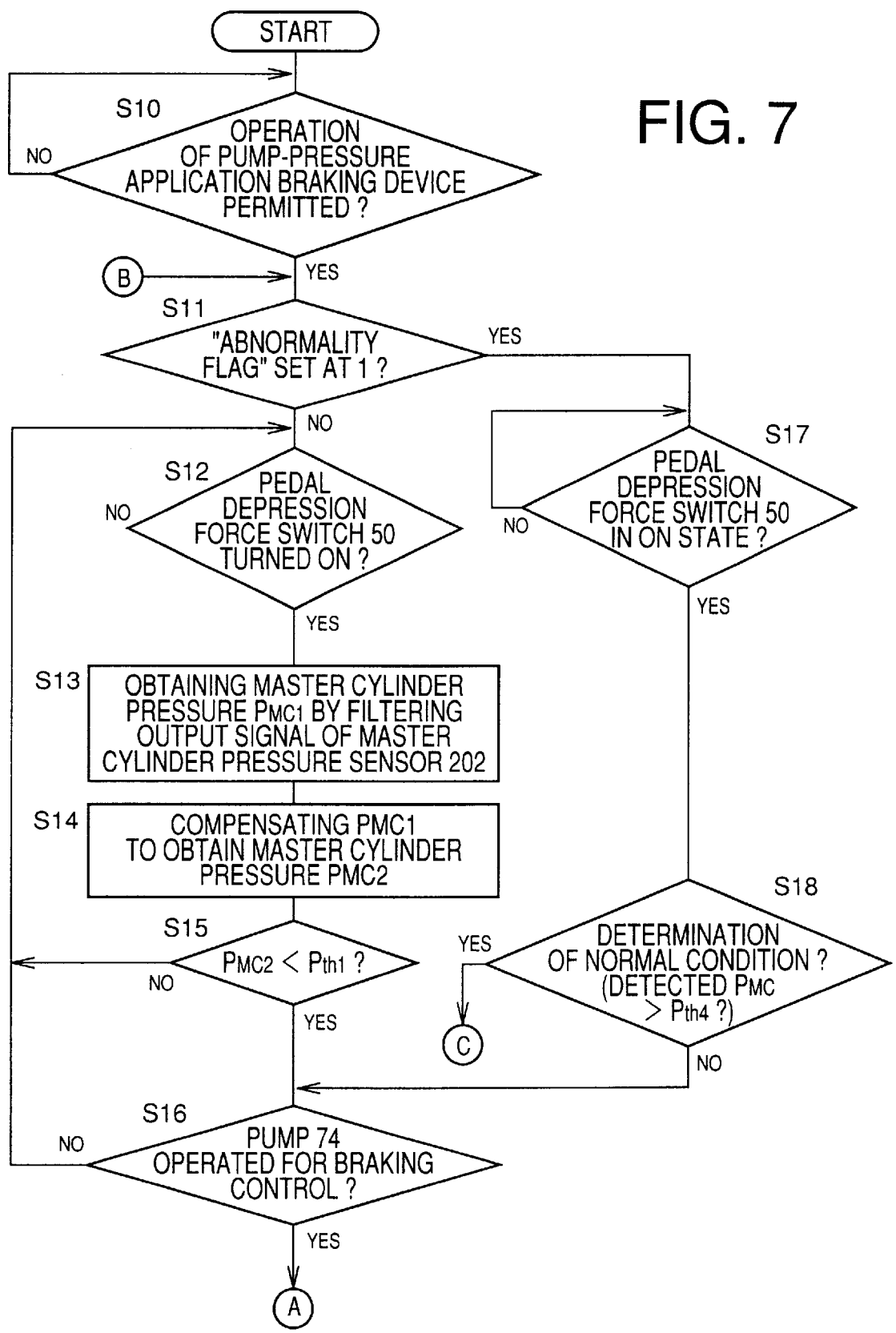
FIG. 7 is a flow chart illustrating a portion of a booster abnormality braking control routine executed by a computer of an electronic control unit shown in FIG. 6.
Figure 9:
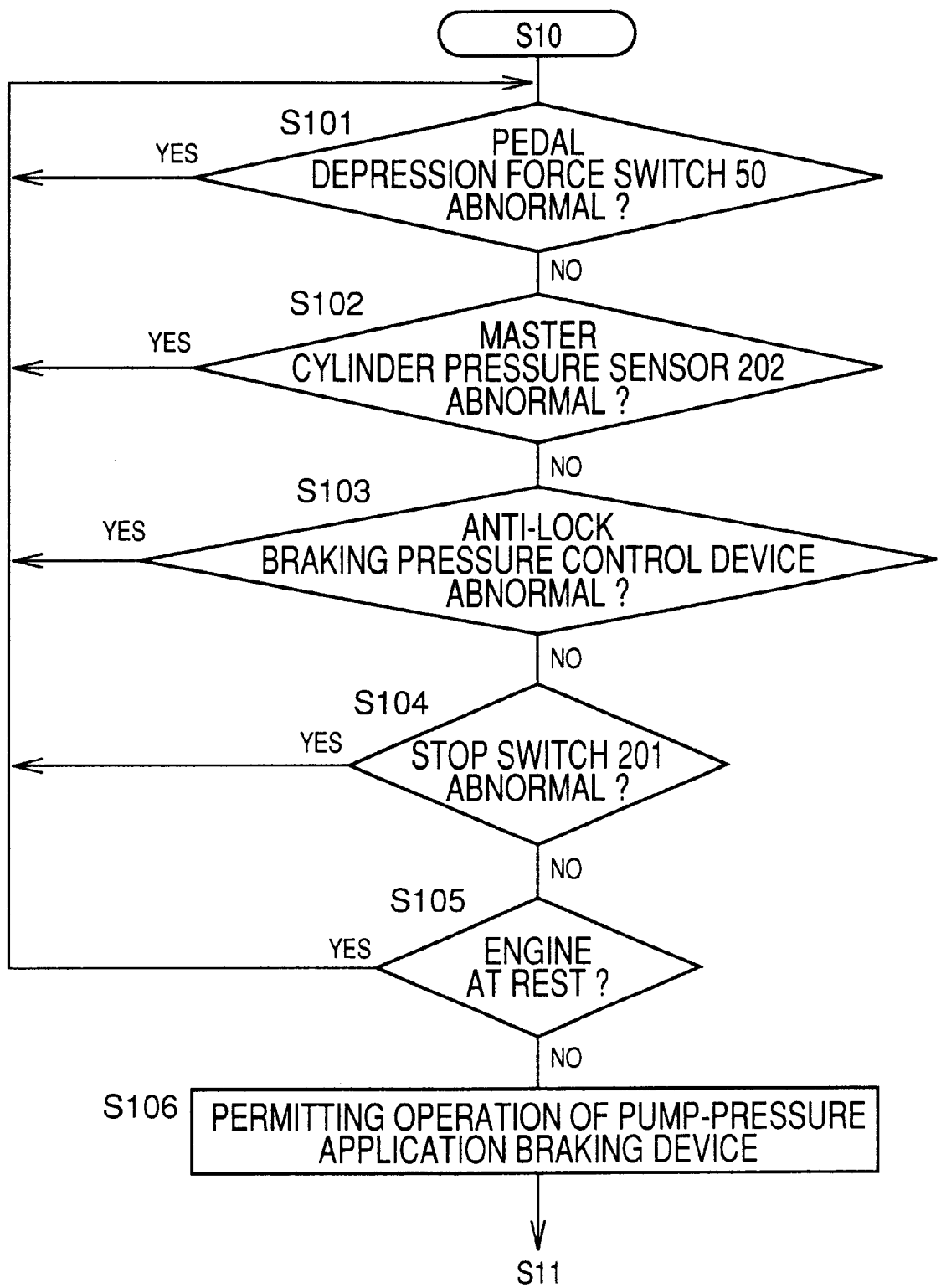
FIG. 9 is a flow chart illustrating details of step S10 of the routine of FIG. 7.
Figure 10:
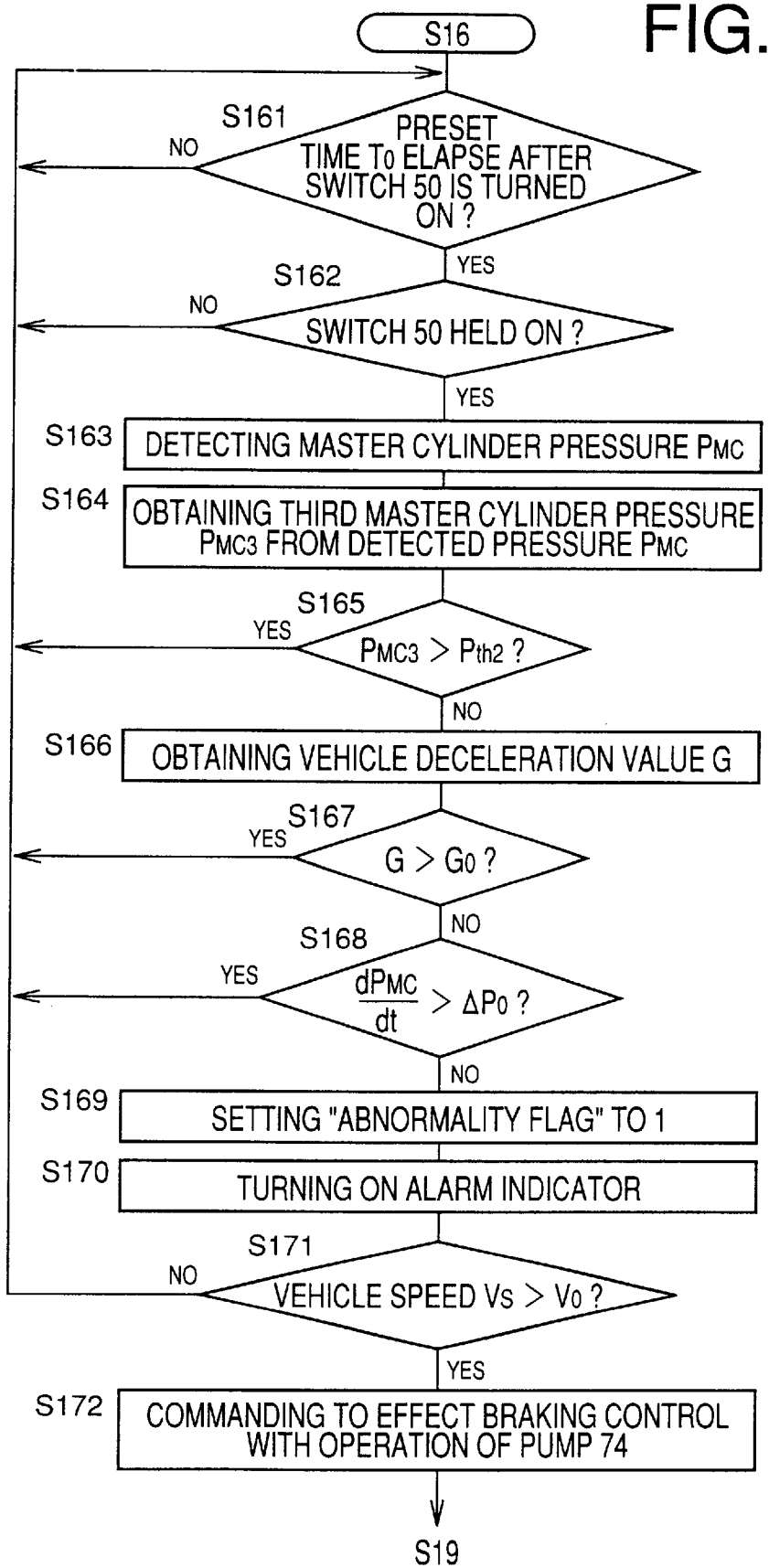
FIG. 10 is a flow chart illustrating details of step S16 of the routine of FIG. 7.

Details of step S10 of FIG. 7 are illustrated in the flow chart of FIG. 9. Initially, step S101 is implemented to determine whether the pedal depression force switch 50 is abnormal having any abnormality such as wire disconnection or short-circuiting. If the switch 50 is abnormal, step S101 is repeated, and the operation of the pump-pressure application braking device is not permitted. If the booster 12 is normal, the control flow goes to step S102 to determine whether the master cylinder pressure sensor 202 is abnormal having any abnormality such as wire disconnection or short-circuiting. If the sensor 202 is abnormal, the control flow goes back to step S101, and the operation of the pump-pressure application braking device is not permitted. If the sensor 202 is normal, the control flow goes to step S103 to determine whether the anti-lock braking pressure control device is abnormal. If this device is abnormal, the control flow goes back to step S101, and the operation of the pump-pressure application braking device is not permitted. If the anti-lock braking pressure control device is normal, the control flow goes to step S104 to determine whether the stop switch 201 is abnormal having any abnormality such as wire disconnection or short-circuiting. If the stop switch 201 is abnormal, the control flow goes back to step S101, and the operation of the pump-pressure application braking device is not permitted. If the stop switch 201 is normal, the control flow goes to step S105 to determine whether the engine of the vehicle is at rest. This determination is made on the basis of the output signal of the engine speed sensor 206. If the engine is at rest, the control flow goes to step S101, and the operation of the pump-pressure application braking device is not permitted. If the engine is operating, the control flow goes to step S106 to permit the operation of the pump-pressure application braking device.

If the operation of the pump-pressure application braking device is permitted, that is, if an affirmative decision (YES) is obtained in step S10 (FIG. 7), the control flow goes to step S11 to determine whether the ABNORMALITY flag is currently set at "1". The ABNORMALITY flag is reset to "0" when the control unit 200 is turned on. If a negative decision (NO) is obtained in step S11, the control flow goes to step S12.

Step S12 is provided to determine whether the pedal depression force switch 50 is turned from OFF to ON. If an affirmative decision (YES) is obtained in step S12, the control flow goes to step S13 to calculate the detected value $P_S$ of the the master cylinder pressure $P_{MC}$, by filtering the output signal of the master cylinder pressure sensor 202, and then set the detected value $P_C$ as a first master cylinder pressure $P_{MC1}$. Step S13 is followed by step S14 in which the first master cylinder pressure $P_{MC1}$ is compensated on the basis of the rate of rise $dP_{MC}/dt$ and the delay time $T_D$, to obtain a second master cylinder pressure $P_{MC2}$. The rate of rise $dP_{MC}/dt$ is calculated as described below with respect to step S168. Then, the control flow goes to step S15 to determine whether the second master cylinder pressure $P_{MC2}$ is lower than the first threshold value $P_{th1}$, that is, whether the booster 12 is abnormal. If the booster 12 is actually normal, and the second master cylinder pressure $P_{MC2}$ is egual to or higher than the first threshold value $P_{th1}$, a negative decision (NO) is obtained in step S15, and the control flow goes back to step S12.

It will be understood that the first determining portion indicated above is constituted by a portion of the control unit 200 which is assigned to implement steps S12–S15, and that the first determining portion functions as a determining device for making adecision that the booster 12 is abnormal.

If the second master cylinder pressure $P_{MC2}$ is lower than the first threshold value $P_{th1}$, indicating a possibility that the booster 12 is abnormal, an affirmative decision (YES) is obtained in step S15, and the control flow goes to step S16.

Figure 21:
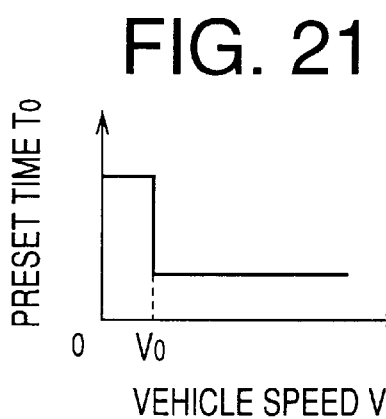
FIG. 21 is a graph indicating a relationship between a preset time $T_0$ and a vehicle running speed $V_S$ in the booster abnormality control routine of FIG. 7.

Details of step S16 are illustrated in the flow chart of FIG. 16. Initially, step S161 is implemented to determine whether the preset time $T_0$ has elapsed after the pedal depression force switch 50 is turned from OFF to ON. The preset time $T_0$ is determined depending upon with the vehicle running speed $V_S$, as shown in FIG. 21. If an affirmative decision (YES) is obtained in step S161, the control flow goes to step S162 to determine whether the pedal depression force switch 50 has been held ON for the preset time $T_0$, that is, whether the switch 50 is in the ON state after the preset time $T_0$ has passed. If a negative decision (NO) is obtained in step S162 because of a depression of the brake pedal 10 for a short time during a so-called "pumping" operation of the brake pedal (involving alternate depression and release actions), the control flow goes back to step S161. If the brake pedal 10 is depressed in an ordinary manner, an affirmative decision (YES) is obtained in step S162. In this case, the control flow goes to step S163.

Step S163 is provided to detect the master cylinder pressure $P_{MC}$. Then, step S164 is implemented to set the detected pressure $P_{MC}$ as a third master cylinder pressure $P_{MC3}$, Step S164 is followed by step S165 to determine whether the third master cylinder pressure $P_{MC3}$ is higher than the first threshold value $P_{th2}$. If an affirmative decision (YES) is obtained in step S165, the control flow goes back to step S161. If a negative decision (NO) is obtained in step S165, the control flow goes to step S166 to obtain the deceleration value G of the vehicle. For instance, the deceleration value G is obtained as a time derivative of the vehicle running speed $V_S$ which is estimated on the basis of the wheel speeds during execution of the anti-lock braking pressure control routine. Then, step S167 is implemented to determine whether the obtained deceleration value G is larger than a reference value $G_0$. If an affirmative decision (YES) is obtained in step S167, the control flow goes back to step S161. If a negative decision (NO) is obtained in step S167, the control flow goes to step S168 to first calculate the rate of rise $dP_{MC}/dt$ of the master cylinder pressure $P_{MC}$, and then determine whether the calculated rate of rise $dP_{MC}/dt$ is higher than a reference value $\Delta P_0$. The rate of rise $dP_{MC}/dt$ is calculated by subtracting a last value $P_{MC(i-1)}$ of the master cylinder pressure $P_{MC}$ obtained in the last control cycle (and stored in the RAM of the control unit 200), from a present value $P_{MC(i)}$ of the same obtained in the present control cycle. If an affirmative decision (YES) is obtained in step S168, the control flow goes back to step S161. If a negative decision (NO) is obtained in step S168, the control flow goes to step S169 to set the ABNORMALITY flag to "1", and to step S170 to turn on the alarm indicator 214. Step S170 is followed by step s171 to determine whether the vehicle running speed $V_S$ is higher than a reference value $V_0$. If a negative decision (NO) is obtained in step S171, the control flow goes back to step S161. If an affirmative decision (YES) is obtained in step S171, the control flow goes to step S172 to command the pump-pressure application braking device to initiate the braking control with operation of the pump 74. Thus, one cycle of execution of step S16 (sub-routine of FIG. 10) is terminated.

It will be understood that the second determining portion indicated above is constituted by a portion of the control unit 200 which is assigned to implement steps S161–S168 (step S16), and that the second determining portion constitutes a part of an optimizing device for optimizing an operation of the determining device to make the decision as to whether the booster 12 is abnormal. However, the first and second determining portions may be considered to constitute the determining device.

Figure 8:
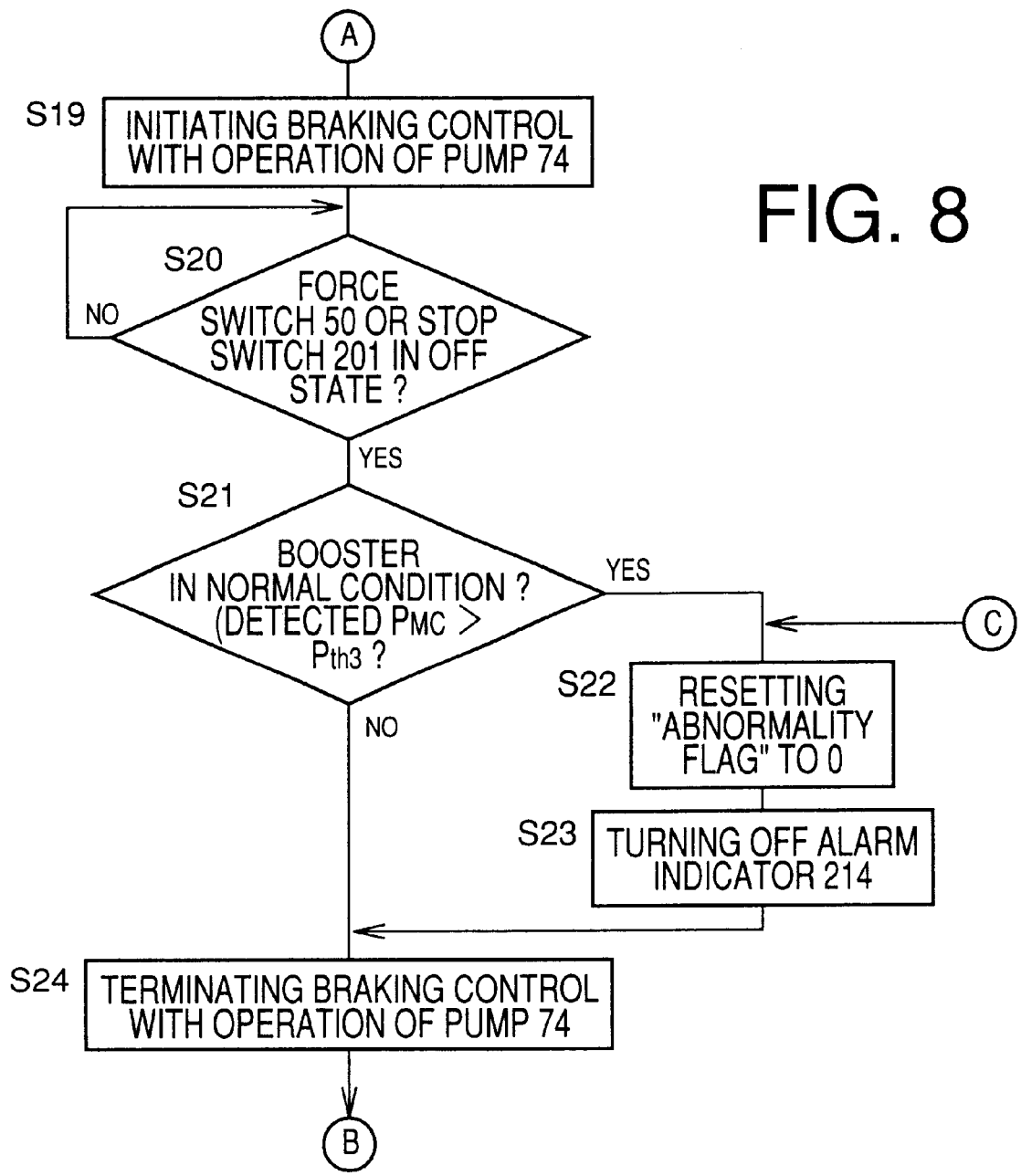
FIG. 8 is a flow chart illustrating the rest of the booster abnormality braking control routine of FIG. 7.

If a negative decision (NO) is obtained in step S16, that is, if step S172 is not implemented, the control flow goes back to step S12. If an affirmative decision (YES) is obtained in step S16, that is, if step S172 is implemented, the control flow goes to step S19 (FIG. 8) in which the pump-pressure application braking device is activated to initiate the braking control with operation of the pump 74 for applying the pump-delivered pressure to the wheel brake cylinders 60. Step S19 is followed by step S20 to determine whether the pedal depression force switch 50 or the stop switch 201 is in the OFF state. If an affirmative decision (YES) is obtained in step S20, that is, when the switch 50 or 201 is turned OFF, the control flow goes to step S21 to determine whether the master cylinder pressure $P_{MC}$ detected by the master cylinder pressure sensor 202 is higher than the third threshold value $P_{th3}$, that is, whether the booster 12 is normal. If an affirmative decision (YES) is obtained in step S21, namely, if the booster 12 has been diagnosed to be normal, the control flow goes to step S22 to reset the ABNORMALITY flag to "0", and then to step S23 to turn off the alarm indicator 214. Step S23 is followed by step S24. If a negative decision (NO) is obtained in step S21 with the detected master cylinder pressure $P_{MC}$ being not higher than the third threshold value $P_{th3}$, it means that the booster 12 is abnormal. In this case, the control flow goes to step S24 while skipping steps S22 and S23. In step S24, the braking control with operation of the pump 74 by the pump-pressure application braking device is terminated. Described more specifically, the solenoid coil 84 of the pressure control valve 70 is de-energized, and the pump motor 210 is turned off to terminate the operation of the pump 74. Further, the solenoid coil 212 of the inflow control valve 132 is de-energized. Thus, one cycle of execution of the booster abnormality braking control routine of FIGS. 7 and 8 is terminated.

It will be understood that the third determining portion indicated above is constituted by a portion of the control unit 200 assigned to implement steps S20–S23, and that the third determining portion constitutes a part of the optimizing device indicated above.

The operation of the control unit 200 where step S11 is implemented when the ABNORMALITY flag is set at "0" has been described above. If step S11 is implemented when the flag is set at "1", an affirmative decision (YES) is obtained in step S11, and the control flow goes to step S17 to determine whether the pedal depression force switch 50 is in the ON state. If an affirmative decision (YES) is obtained in step S17, the control flow goes to step S18 to determine whether the master cylinder pressure $P_{MC}$ detected by the master cylinder pressure sensor 202 is higher than the fourth threshold value $P_{th4}$ (which is equal to the first threshold value $P_{th1}$), that is, whether the booster 12 is normal. If an affirmative decision (YES) is obtained in step S18, that is, if the booster 12 has been diagnosed to be normal, the control flow goes to steps S22 and S23 to reset the ABNORMALITY flag to "0" and turn off the alarm indicator 214. If a negative decision (NO) is obtained in step S18, that is, if the booster 12 is abnormal, the control flow goes to step S16 to determine whether the final decision that the booster 12 is abnormal should be made, that is, implement steps S161–S171, and step S172 if appropriate. In this case, therefore, the first determining portion is not operated (steps S12–S15 are not implemented), before the second determining portion (step S16 is implemented).

It will be understood that the fourth determining portion indicated above is constituted by a portion of the control unit 200 assigned to implement steps S11, S17 and S18, and that the fourth determining portion constitutes a part of the optimizing device indicated above. Where the first determining portion constitutes the determining device, the second, third and fourth determining portions constitute the optimizing device. Where the first and second determining portions constitute the determining device, the third and fourth determining portions constitute the optimizing device.

While the booster abnormality braking control routine has been described above by reference to the flow charts of FIGS. 7–10, the anti-lock braking pressure control routine will be described.

The anti-lock braking pressure control routine is executed to control the braking pressure applied to each wheel brake cylinder 60 during brake application, so as to prevent an excessive amount of locking of the corresponding wheel, by selectively establishing an appropriate one of a pressure increase mode, a pressure hold mode and a pressure decrease mode, on the basis of the wheel speeds detected by the wheel speed sensors 204 and the estimated vehicle speed. In the pressure increase mode, the pressure holding valve 100 is placed in its open state while the pressure reducing valve 110 is placed in its closed state. In the pressure hold mode, the pressure holding and reducing valves 100, 110 are both placed in the closed state. In the pressure decrease mode, the pressure holding valve 100 is placed in its closed state while the pressure reducing valve 110 is placed in its open state. During execution of the anti-lock braking pressure control routine, the pump motor 210 is kept operated so that the fluid pumped up by the pump 74 from the reservoir 108 is returned to the fluid back to the main fluid passage 64.

Figure 25:
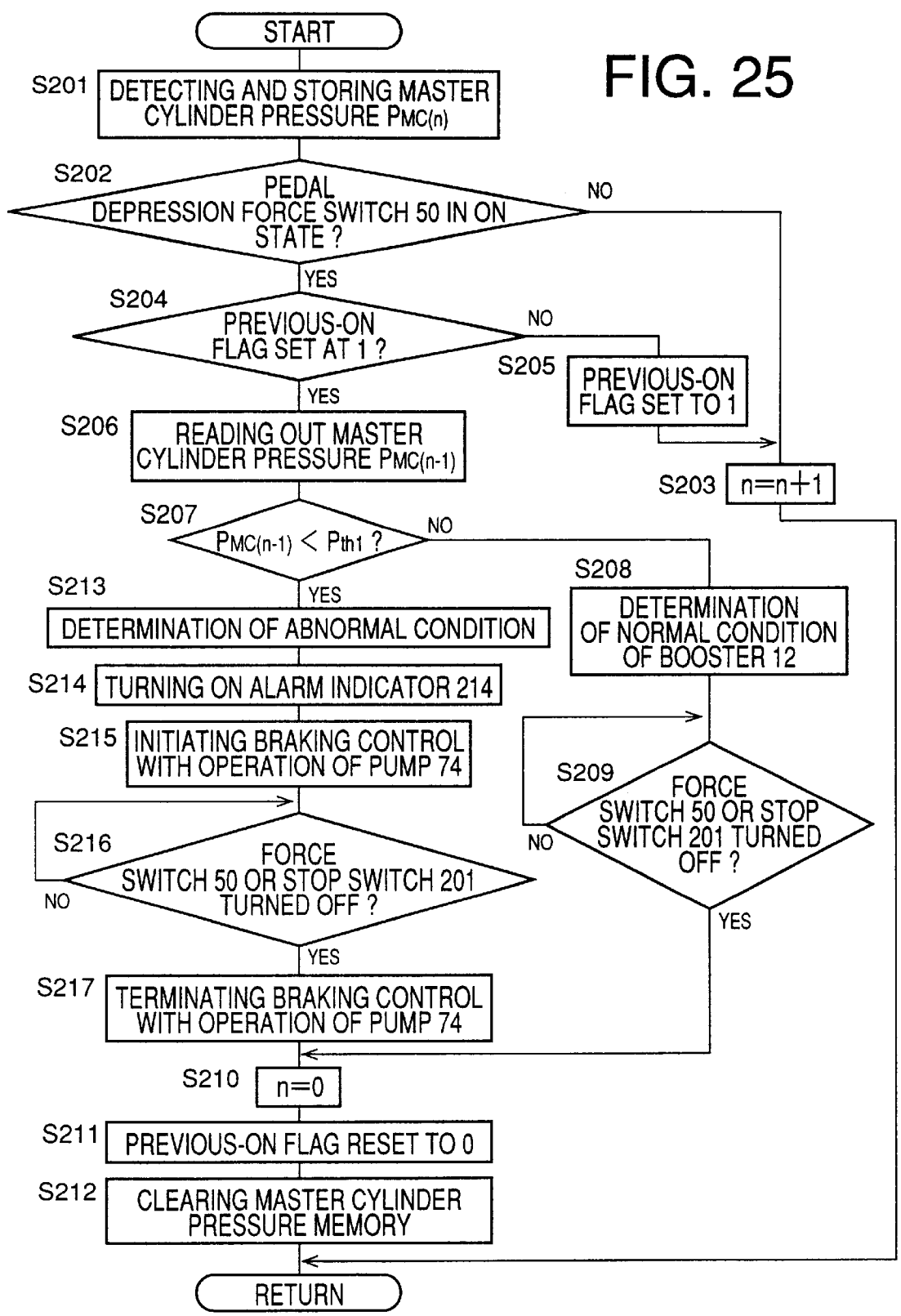
FIG. 25 is a flow chart illustrating a booster abnormality braking control routine executed by a computer of an electronic control unit in a booster abnormality diagnosing apparatus according to a second embodiment of this invention.

Referring next to FIGS. 25 and 26, there will be described a booster abnormality diagnosing apparatus constructed according to a second embodiment of the present invention. The booster abnormality diagnosing apparatus of the second embodiment is identical in the hardware with the apparatus of the first embodiment, and is different in the software from the apparatus of the first embodiment. Accordingly, only the booster abnormality braking control routine according to the second embodiment will be described in detail, and there will not be provided redundant description of the hardware of the second embodiment wherein the same reference signs as used in the first embodiment are used to identify the same elements.

In the first embodiment, the diagnosis of the booster 12 is initiated immediately after the pedal depression force switch 50 has been turned from OFF to ON. That is, the determination in step S15 as to whether the master cylinder pressure $P_{MC}$ is lower than the first threshold $P_{th1}$ is made immediately after the pedal depression force switch 50 has been turned ON. In the present second embodiment, however, the diagnosis of the booster 12 by determining whether the master cylinder pressure $P_{MC}$ is lower than the first threshold $P_{th1}$ is initiated if the force switch 50 is held ON in the present control cycle where the force switch 50 was found in the last control cycle to have been turned ON.

Thus, the diagnosis of the booster 12 is initiated only where the force switch 50 has been found in the ON state for two consecutive control cycles. The determination as to whether the force switch 50 is ON is made by determining whether the depression force $F_P$ acting on the brake pedal 10 is equal to or larger than the preset value $F_{PS}$. Further, the master cylinder pressure $P_{MC}$ when the force switch 50 was turned ON for the first time (i.e., in the last control cycle) is compared with the predetermined threshold Pth1, if the force switch 50 is found to remain in the ON state in the present control cycle, to determine whether the booster 12 is abnormal or not. The value of the master cylinder pressure $P_{MC}$ when the force switch 50 was turned ON for the first time is used for the diagnosis because the above-indicated value is considered to be sufficiently close to the value when the actual value of the brake pedal depression force $F_P$ is equal to the preset value $F_{PS}$. In the present second embodiment, therefore, the diagnosis initiating condition for initiating the diagnosis of the booster 12 is satisfied when the force switch 50 has been found to be ON two consecutive times or in two consecutive control cycles, and the diagnosis is made based on the master cylinder pressure $P_{MC}$ detected when the force switch 50 is found to be ON for the first time in the last control cycle, namely, a predetermined time before the diagnosis initiating condition for initiating the diagnosis has been satisfied. This predetermined time is equal to a cycle time with which the master cylinder pressure $P_{MC}$ is detected.

A booster abnormality braking control routine executed in the present second embodiment is illustrated in the flow chart of FIG. 25. This routine is initiated when the ignition switch of the vehicle is turned ON, and is repeatedly executed with a predetermined cycle time Δt. Each cycle of execution of the routine is initiated with step S201 in which the detected value $P_S$ of the master cylinder pressure $P_{MC}$ is calculated on the basis of the filtered value of the output signal of the master cylinder pressure sensor 202. The detected value $P_S$ is stored in the RAM of the computer of the electronic control unit 200, as a value $P_{MC(n)}$ of the master cylinder pressure $P_{MC}$ obtained in the present control cycle. "n" is an integer representing the identification number of the value $P_{MC(n)}$.

Step S201 is followed by step S202 to determine whether the force switch 50 is in the ON state. If the force switch 50 is in the OFF state in the present control cycle, a negative decision (NO) is obtained in step S202, and the control flow goes to step S203 to increment the number "n". In this case, one control cycle of the routine of FIG. 25 is terminated.

If the force switch 50 is in the ON state, an affirmative decision (YES) is obtained in step S202, and the control flow goes to step S204 to determine whether a PREVIOUS-ON flag is set at "1". When this flag is set at "0", it indicates that the force switch 50 was not in the ON state in the last control cycle. When this flag is set at "1", it indicates that the force switch 50 was in the ON state in the last control cycle. The PREVIOUS-ON flag is reset to "0" when the electronic control unit 200 is turned ON with power applied thereto. If a negative decision (NO) is obtained in step S204, the control flow goes to step S205 to set the PREVIOUS-ON flag to "1". Step S205 is followed by step S203 to increment the number "n", and one control cycle of the routine is terminated.

If the force switch 50 which was turned ON in the last control cycle and remains in the ON state in the present control cycle, the affirmative decision (YES) is obtained in step S202, and also in step S204 since the PREVIOUS-ON flag was set to "1" in step S205 in the last control cycle. Accordingly, the control flow goes to step S206 to read out from the RAM the master cylinder pressure $P_{MC(n-1)}$ which was obtained in the last control cycle. Step S206 is followed by step S207 to determine whether the read-out master cylinder pressure $P_{MC(n-1)}$ is lower than a predetermined first threshold value $P_{th1}$, which is determined in the same manner as in the first embodiment, that is, so as to decrease with an increase in the rate of rise of the master cylinder pressure $dP_{MC}/dt$, as shown in FIG. 14. That is, the first threshold value $P_{th1}$ is determined to be substantially equal to the critical value $P_{K0}$ which is the minimum value of the master cylinder pressure $P_{MC}$ (an example of the output quantity relating to the output of the booster 12) when the brake pedal depression force $F_P$ (an example of the input quantity relating to the input of the booster 12) is equal to the preset value $F_{PS}$ while the booster 12 is normal.

If the master cylinder pressure $P_{MC(n-1)}$ obtained in the last control cycle is not lower than the first threshold value $P_{th1}$, that is, if a negative decision (NO) is obtained in step S207, the control flow goes to step S208 to determine that the booster 12 is normal. Then, the control flow goes to step S209 to determine whether the force switch 50 or the stop switch 201 has been turned OFF. If an affirmative decision (YES) is obtained in step S209, it means that one braking operation of the braking system initiated by an operation of the brake pedal 10 has been terminated. If the affirmative decision is obtained in step S209, the control flow goes to step S210 to reset the number "n" to "0". Step S210 is followed by step S211 to reset the PREVIOUS-ON flag to "0". The control flow then goes to step S212 to clear a master cylinder pressure memory in the RAM of the electronic control unit 200 in which the master cylinder pressure values $P_{MC(n)}$ are stored. Thus, one control cycle of the routine is terminated.

If the master cylinder pressure value $P_{MC(n-1)}$ detected in the last control cycle is lower than the first threshold value $P_{th1}$, an affirmative decision (YES) is obtained in step S207, and the control flow goes to step S213 to determine that the booster 12 is abnormal. Step S213 is followed by step S214 to turn on the alarm indicator 214, for informing the vehicle operator that the booster 12 is abnormal. Step S214 is followed by step S215 in which the pump 74 is operated to effect the braking control as in the first embodiment, until the present braking operation initiated by an operation of the brake pedal 10 has been terminated. Described in detail, step S215 is implemented to initiate the braking control with an operation of the pump 74. Step S215 is followed by step S216 to determine whether the force switch 50 or the stop switch 201 has been turned OFF, that is, whether the present braking operation has been terminated. If an affirmative decision (YES) is obtained in step S216, the control flow goes to step S217 to terminate the braking control with operation of the pump 74. Then, steps S210, S211 and S212 are implemented as described above. Thus, one control cycle of the routine of FIG. 25 is terminated.

The time chart of FIG. 26 indicates the diagnosis of the booster 12 according to the booster abnormality braking control routine of FIG. 25. The time chart indicates not only the actual operating state ("actual output signal") of the force switch 50, but also the operating state ("ECU input signal") of this force switch 50 as detected by the electronic control unit (ECU) 200 at a predetermined time interval.

The time interval at which the electronic control unit 200 receives the actual output signal of the force switch 50 is equal to the cycle time at which the booster abnormality braking control routine of FIG. 25 is executed. In other words, a point of time at which the ECU input signal of the force switch 50 is turned from OFF to ON is necessarily coincident with the expiration of the cycle time of the routine or the end of each control cycle. On the other hand, the actual output signal of the force switch 50 is turned from OFF to ON irrespective of the cycle time, and is not always coincident with the end of each control cycle. Accordingly, the master cylinder pressure $P_{MC}$ when the ECU input signal of the force switch 50 is turned ON is not necessarily equal to the master cylinder pressure $P_{MC}$ when the actual output signal of the force switch 50 is turned ON (when the actual value of the brake pedal depression force $F_P$ has reached the preset value $F_{PS}$).

As described above, the present second embodiment is arranged such that the diagnosis initiating condition is satisfied, that is, the diagnosis of the booster 12 is initiated when the output signal of the force switch 50 as detected by the electronic control unit 200 is found to be in the ON state in the two consecutive control cycles. This arrangement assures improved accuracy of the diagnosis as to whether the booster 12 is normal or abnormal. In this arrangement, therefore, the master cylinder pressure $P_{MC(n)}$ when the diagnosis initiating condition is satisfied is considerably different from that when the force switch 50 is actually turned from OFF to ON, that is, different from the master cylinder pressure $P_{MC}$ when the actual value of the brake pedal depression force $F_P$ has reached the preset value $F_{PS}$, provided that the master cylinder pressure $P_{MC}$ increases as indicated in FIG. 26. In view of this considerable difference, the second embodiment is further arranged such that the master cylinder pressure $P_{MC(n-1)}$ when the force switch 50 was turned ON for the first time (in the last control cycle) is compared with the threshold value $P_{th1}$ in step S207, since this master cylinder pressure $P_{MC(n-1)}$ is relatively close to the master cylinder pressure $P_{MC}$ when the actual value of the brake pedal depression force $F_P$ has reached the present value $F_{PS}$. Thus, the present second embodiment assures improved accuracy of the diagnosis without sacrificing the accuracy of the master cylinder pressure $P_{MC}$ as a parameter representing a difference of the actual brake pedal depression force $F_P$ from the present value $F_{PS}$.

It will be understood that a portion of the electronic control unit 200 assigned to implement steps S201, S202 and S207 constitute the determining device for determining whether the booster is abnormal or not. on the basis of the operating state of the force switch 50 and the master cylinder pressure $P_{MC}$ when the force switch 50 is turned ON. It will also be understood that a portion of the electronic control unit 200 assigned to implement steps S203–S207 and steps s210–S212 constitute the optimizing device for optimizing the operation of the determining device.

In the second embodiment, the master cylinder pressure $P_{MC(n-1)}$ detected in the last control cycle preceding present control cycle in which the diagnosis initiating condition is satisfied is used in step S207 to determine whether the booster 12 is abnormal or not. However, the master cylinder pressure $P_{MC(n-2)}$ detected in the control cycle preceding the last control cycle in which the force switch 50 is found to be ON for the first time can be used to effect the diagnosis of the booster 12. In this case, the determination that the booster 12 is abnormal is more easily obtained in step S207, that is, the affirmative decision (YES) is more easily obtained in step S207, so that the booster abnormality diagnosing apparatus is more sensitive to the deterioration of the operating state of the booster 12.

While the second embodiment uses the relatively inexpensive pedal depression force switch 50 whose output signal changes in two states (OFF and ON states) to indicate whether the actual value of the brake pedal depression force $F_P$ has reached the present value $F_{PS}$, the booster abnormality diagnosing apparatus according to the present invention may use a relatively expensive pedal depression force switch whose output signal changes in three states. In this case, a filter used for filtering the output signal of the master cylinder pressure sensor 202 is preferably used for filtering the output signal of the brake pedal depression force switch, for improving the accuracy of detection of the actual brake pedal depression force $F_P$ as compared with the preset value $F_{PS}$. Where such a filter is used for the output signal of the force switch, a change in the filtered output signal tends to be delayed with respect to a change in the actual value of the brake pedal depression force $F_P$. However, an influence of this delay due to the use of the filter may be reduced or eliminated by using in step S207 the master cylinder pressure $P_{MC}$ which is detected a suitable time (e.g., a suitable number of control cycles) before the diagnosis initiating condition is satisfied.

While the several embodiments of this invention have been described above in detail by reference to the accompanying drawings, it is to be understood that the invention is not limited to the details of the illustrated embodiments, but may be embodied with various changes, modifications and improvements which may occur to those skilled in the art, without departing from the spirit and scope of the invention defined in the following claims.

What is claimed is:

1. An apparatus for diagnosing a booster of a braking system for an automotive vehicle, said braking system including a brake operating member operated with a brake operating force, a master cylinder for producing a hydraulic pressure on the basis of an output force of said booster produced as a result of boosting of said brake operating force by said booster, and a wheel brake cylinder which is activated by the hydraulic pressure produced by said master cylinder, to brake a wheel of the automotive vehicle, said apparatus comprising:

a determining device for making a provisional decision as to whether said booster is abnormal or not, on the basis of a relationship between an input quantity relating to an input of said booster and an output quantity relating to an output of said booster; and an optimizing device for determining said provisional decision as a final decision or rectifying said provisional decision.

2. An apparatus according to claim 1, wherein said optimizing device includes change-rate obtaining means for obtaining a rate of change of at least one of said input quantity and said output quantity, and means for determining whether said booster is abnormal or not, on the basis of said rate of change obtained by said change-rate obtaining means, as well as said input and output quantities.

3. An apparatus according to claim 2, wherein said change-rate obtaining means obtains said rate of change of said at least one of said input and output quantities when said brake operating force is equal to a predetermined value which is not zero, and said determining device comprises means for determining whether said booster is abnormal or not, by comparing said output quantity with a threshold value, and threshold changing means for changing said threshold value such that said threshold value is smaller when said rate of change obtained when said brake operating force is equal to said predetermined value is relatively high than when said rate of change is relatively low.

4. An apparatus according to claim 3, wherein said change-rate obtaining means for obtaining said rate of change when said brake operating force is equal to said predetermined value obtains a highest value of said rate of change when or after said brake operating force has been increased to said predetermined value.

5. An apparatus according to claim 1, wherein said determining device determines whether said booster is abnormal or not, according to a first rule, and said optimizing device comprises additional means operable when said determining device has made said provisional decision that said booster is abnormal, for making said final decision as to whether said booster is abnormal or not, according to a second rule different from said first rule.

6. An apparatus according to claim 5, wherein said determining device makes said provisional decision that said booster is abnormal, during an operation of said brake operating member, and said additional means determines whether said brake operating member has been operated for more than a predetermined period of time after a reference point of time relating to a point of time at which said provisional decision has been made, said additional means making said final decision that said booster is not abnormal, if said brake operating member has not been operated for more than said predetermined period of time.

7. An apparatus according to claim 6, wherein said predetermined period of time is shorter when said automotive vehicle is running than when said automotive vehicle is at rest.

8. An apparatus according to claim 6, wherein said predetermined period of time changes with a change in a running speed of said automotive vehicle.

9. An apparatus according to claim 6, wherein said predetermined period of time changes with a change in a rate of change of at least one of said input quantity and said output quantity of said booster.

10. An apparatus according to claim 6, wherein said determining device comprises a first determining portion for making said provisional decision as to whether said booster is abnormal or not, by comparing said output quantity with a first threshold value, and said additional means comprises a second determining portion for making said final decision as to whether said booster is abnormal or not, by comparing said output quantity with a second threshold value larger than said first threshold value.

11. An apparatus according to claim 10, wherein said first determining portion determines whether said output quantity when said input quantity is equal to a preset value which is not zero is smaller than said first threshold value, and makes said provisional decision that said booster is abnormal, if said output quantity is smaller than said first threshold value, and said second determining portion determines whether said output quantity a predetermined time after said provisional decision has been made is smaller than said second threshold value, and makes said final decision that said booster is abnormal, if said output quantity is smaller than said second threshold value, and wherein said apparatus is designed to diagnose said booster to be abnormal if said output quantity when said input quantity is equal to a reference value larger than said preset value is smaller than a nominal value corresponding to said reference value, and said booster is designed such that said output quantity when said input quantity is equal to said preset value is larger than said nominal value, said second threshold value being determined to be equal to said nominal value or larger.

12. An apparatus according to claim 10, wherein said second determining portion of said additional means comprises means operable when said second determining portion determines that said booster is abnormal, for determining whether at least one of said output quantity and a rate of change of said output quantity is larger than a reference value, and determining that said booster is not abnormal, irrespective of the relationship between said input and output quantities.

13. An apparatus according to claim 5, wherein said additional means comprises means operable when said determining device has made said provisional decision that said booster is abnormal, for determining whether at least one of said output quantity and a rate of change of said output quantity is larger than a reference value, and determining that said booster is not abnormal, irrespective of the relationship between said input and output quantities.

14. An apparatus according to claim 5, wherein said determining device and said additional means of said optimizing device are operated repeatedly, as long as said determining device makes the provisional decision that said booster is abnormal while said additional means makes the final decision that the booster is not abnormal, and wherein said optimizing device further comprises simplified determining means operable when said additional means has made the final decision that said booster is abnormal, for inhibiting said determining device from being operated, and determining, in the same manner as said determining device, whether said booster is abnormal or not, said simplified determining means inhibiting said additional means from being operated when said simplified determining means has made a final decision that said booster is not abnormal.

15. An apparatus according to claim 5, wherein said determining device and said additional means of said optimizing device are operated repeatedly, as long as said determining device makes the provisional decision that the booster is abnormal while the additional means makes the final decision that the booster is not abnormal, and wherein said optimizing device further comprises simplified determining means operable when said additional means has made the final decision that said booster is abnormal, for inhibiting said determining device from being operated, and determining, in the same manner as said determining device, whether said booster is abnormal or not, said simplified determining means inhibiting said additional means from being operated when said simplified determining means has made a final decision that said booster is abnormal.

16. An apparatus according to claim 1, further comprising a sensor for detecting said output quantity, and wherein said determining device comprises calculating means for obtaining a detected value of said output quantity on the basis of an output signal of said sensor, and compensating means for obtaining a compensated value of said output quantity by compensating said detected value depending upon a delay time required for said detected value to become equal to an actual value of said output quantity, said determining device making said provisional decision on the basis of said compensated value of said output quantity.

17. An apparatus according to claim 16, wherein said compensating means detects a rate of change of said output quantity, and estimates said delay time on the basis of the detected rate of change and according to a predetermined relationship between said rate of change and said delay time, said compensating means compensating said detected value of said output quantity by obtaining a product of the estimated delay time and said rate of change.

18. An apparatus according to claim 1, wherein said determining device determines whether said booster is abnormal or not, while said brake operating member is being operated from a non-operated position to an operated position, and said optimizing device comprises decision cancelling means operable after said determining device has made the provisional decision that said booster is abnormal and during a time period between a point of time when an operation of said brake operating member from said operated position back to said non-operated position is initiated and a point of time when a next operation of said brake operating member from said non-operated position to said operated position is initiated, said decision cancelling means determining whether said booster is normal or not, and cancelling said provisional decision by said determining device that said booster is abnormal, if said decision cancelling means determines that said booster is normal.

19. An apparatus according to claim 18, wherein said decision cancelling means determines whether said booster is normal or not, by comparing said output quantity at a predetermined point of time during said time period with a predetermined threshold.

20. An apparatus according to claim 19, wherein said predetermined threshold is larger than a minimum value of said output quantity at said predetermined point of time, and said decision cancelling means determines that said booster is normal, if said output quantity at said predetermined point of time is not smaller than said predetermined threshold.

21. An apparatus according to claim 1, further comprising inhibiting means for inhibiting operations of said determining and optimizing devices when a drive power source of the automotive vehicle is substantially at rest.

22. An apparatus according to claim 1, further comprising inhibiting means for inhibiting operations of said determining and optimizing devices when the automotive vehicle is substantially at rest.

23. An apparatus according to claim 1, further comprising inhibiting means for inhibiting operations of said determining and optimizing devices when the automotive vehicle and a drive power source of the automotive vehicle are substantially at rest.

24. An apparatus according to claim 1, wherein said determining device includes means for obtaining said input quantity at a predetermined time interval and making said provisional decision as to whether said booster is abnormal or not, if the obtained input quantity satisfies a predetermined condition, and said optimizing device commands said determining device to make said provisional decision as to whether said booster is abnormal or not, only if the obtained input quantity has satisfied a predetermined plurality of times.

25. An apparatus according to claim 24, wherein said determining device includes a switch which is placed in a first state when said input quantity is smaller than a predetermined value larger than zero, and in a second state when said input quantity is not smaller than said predetermined value, said predetermined condition being satisfied when said switch is placed in said second state.

26. An apparatus according to claim 24, wherein said determining device includes a sensor whose output changes in three steps or continuously, depending upon said input quantity, said predetermined condition being satisfied when the input quantity represented by said output of said sensor is larger than a predetermined value larger than zero.

27. An apparatus according to claim 1, wherein said determining device includes means for obtaining said input quantity at a predetermined time interval and determining that a diagnosis initiating condition is satisfied when the obtained input quantity is larger than a predetermined value larger than zero, said determining device further including means operable when said diagnosis initiating condition is satisfied, for effecting a diagnostic determination that said booster is abnormal, if said output quantity which changes in relation to the input quantity is smaller than a predetermined threshold which is substantially equal to a minimum value that can be taken by said output quantity when the input quantity is equal to the predetermined value thereof while the booster is normal, and wherein said optimizing device includes means for commanding said determining device to use, for said diagnostic determination, a value of said output quantity which is obtained a predetermined time before said determining device has determined that said diagnosis initiating condition is satisfied.

28. An apparatus according to claim 27, wherein said determining device includes means for obtaining said output quantity from time to time with a predetermined cycle time which is substantially the same as said predetermined time interval at which said input quantity is obtained, said determining device determining that said diagnosis initiating condition is satisfied, immediately after said determining device determines that the obtained input quantity has become larger than said predetermined value, and said optimizing device commands said determining device to effect the diagnostic determination as to whether said booster is abnormal or not, on the basis of at least a second value of the output quantity which is obtained said predetermined cycle time before a first value of the output quantity is obtained when said obtained input quantity has become larger than said predetermined value.

29. An apparatus according to claim 27, wherein said optimizing device includes means for commanding said determining device to determine that said diagnosis initiating condition is satisfied, if said obtained input quantity has become larger than said predetermined value a predetermined plurality of times, and to use, for said diagnostic determination, a value of said output quantity which is obtained when said obtained input quantity has become larger than said predetermined value for the first time.

30. An apparatus according to claim 27, wherein said determining device includes means for obtaining said output quantity from time to time with a predetermined cycle time which is substantially the same as said predetermined time interval at which said input quantity is obtained, and said optimizing device commands said determining device to determine that said diagnosis initiating condition is satisfied, if said obtained input quantity has become larger than said predetermined value a predetermined plurality of times, and when said diagnosis initiating condition is satisfied, effect the diagnostic determination as to whether said booster is abnormal or not, on the basis of at least one of a first value of the output quantity which is obtained when said obtained input quantity has become larger than said predetermined value for the first time, and a second value which is obtained said predetermined cycle time before said obtained input quantity has become larger than said predetermined value for the first time.

31. An apparatus according to claim 29, wherein said determining device includes a switch which is placed in a first state when said input quantity is smaller than a predetermined value larger than zero, and in a second state when said input quantity is not smaller than said predetermined value, and said optimizing device commands said determining device to determine that said diagnosis initiating condition is satisfied, if said switch is found to be placed in said second state a predetermined plurality of times.

32. An apparatus according to claim 29, wherein said determining device includes a sensor whose output changes in three steps or continuously, depending upon said input quantity, and said optimizing device command said determining device to determine that said diagnosis initiating condition is satisfied, if said input quantity represented by said output of said sensor is found to be larger than said predetermined value said predetermined plurality of times.

33. An apparatus according to claim 30, wherein said optimizing device commands said determining device to use said first value of said output quantity which is obtained when said obtained input quantity has become larger than said predetermined value for the first time.

34. An apparatus according to claim 28, wherein said optimizing means commands said determining device to use, for said diagnostic determination, said second value of the output quantity.

35. An apparatus according to claim 28, wherein said optimizing means command said determining device to use, for said diagnostic determination, a value calculated on the basis of both of said first and second values.

36. An apparatus according to claim 30, wherein said optimizing means commands said determining device to use, for said diagnostic determination, said second value of the output quantity.

37. An apparatus according to claim 30, wherein said optimizing means command said determining device to use, for said diagnostic determination, a value calculated on the basis of both of said first and second values.

38. An apparatus for diagnosing a booster of a braking system for an automotive vehicle, said braking system including a brake operating member operated with a brake operating force, a master cylinder for producing a hydraulic pressure on the basis of an output force of said booster produced as a result of boosting of said brake operating force by said booster, and a wheel brake cylinder which is activated by the hydraulic pressure produced by said master cylinder, to brake a wheel of the automotive vehicle, said apparatus comprising:

a diagnosing device for making a decision as to whether said booster is abnormal or not;

determining means for determining whether a period of time during which said brake operating member has been kept in an operated state is shorter than a preset time; and inhibiting means for inhibiting an operation of said diagnosing device if said determining means determines that said period of time is shorter than said preset time.

39. An apparatus for diagnosing a booster of a braking system for an automotive vehicle, said braking system including a brake operating member operated with a brake operating force, a master cylinder for producing a hydraulic pressure on the basis of an output force of said booster produced as a result of boosting of said brake operating force by said booster, and a wheel brake cylinder which is activated by the hydraulic pressure produced by said master cylinder, to brake a wheel of the automotive vehicle, said apparatus comprising:

first determining means for determining whether said booster is abnormal or not, while said brake operating member is being operated from a non-operated position to an operated position; and second determining means for determining whether said booster is abnormal or not, during a time period between a point of time when an operation of said brake operating member from said non-operated position back to said non-operated position is initiated and a point of time when a next operation of said brake operating member from said non-operated position to said operated position is initiated.

* * * * *